US006653965B2

United States Patent
Ikai

(10) Patent No.: US 6,653,965 B2
(45) Date of Patent: Nov. 25, 2003

(54) DIGITAL SERVO CONTROL METHOD, DIGITAL SERVO CONTROLLER, STORAGE DEVICE AND HEAD POSITION CONTROL METHOD

(75) Inventor: Yoshiaki Ikai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/390,111

(22) Filed: Mar. 17, 2003

(65) Prior Publication Data

US 2003/0156510 A1 Aug. 21, 2003

Related U.S. Application Data

(63) Continuation of application No. PCT/JP01/02840, filed on Mar. 30, 2001.

(30) Foreign Application Priority Data

Sep. 19, 2000 (JP) ........................................ 2000-283464

(51) Int. Cl.[7] .......................... H03M 1/12; G11B 5/596
(52) U.S. Cl. ................ 341/155; 360/77.04; 360/78.04; 341/50
(58) Field of Search ............................ 341/155, 50, 51; 360/77.04, 78.04, 77.08

(56) References Cited

U.S. PATENT DOCUMENTS

| | | | | |
|---|---|---|---|---|
| 5,151,639 A | * | 9/1992 | Hasegawa et al. | 318/568.18 |
| 5,585,976 A | * | 12/1996 | Pham | 360/77.04 |
| 5,680,271 A | * | 10/1997 | Yatsu | 360/78.09 |
| 5,680,272 A | * | 10/1997 | Kadlec et al. | 360/78.04 |
| 6,118,616 A | * | 9/2000 | Jeong | 360/78.07 |
| 6,243,226 B1 | * | 6/2001 | Jeong | 360/78.07 |
| 6,347,018 B1 | * | 2/2002 | Kadlec et al. | 360/77.08 |

FOREIGN PATENT DOCUMENTS

| | | | |
|---|---|---|---|
| JP | 63-181003 | * | 7/1988 |
| JP | 3-262003 | * | 11/1991 |
| JP | 4-137009 | * | 5/1992 |
| JP | 4-291822 | * | 10/1992 |
| JP | 9-82050 | * | 3/1997 |
| JP | 9-230895 | * | 9/1997 |
| JP | 10-149553 | * | 6/1998 |

* cited by examiner

Primary Examiner—Jean Bruner Jeanglaude
(74) Attorney, Agent, or Firm—Greer, Burns & Crain, Ltd.

(57) ABSTRACT

A digital servo controller generates a control signal from an analog observation signal using an output equation, state equation or a transfer function, and performs high precision servo-control with an inexpensive configuration. In a digital servo which executes an output equation $yd[k]=C \cdot x[k]+D \cdot ud[k]$ and state equation $x[k+1]=A \cdot x[k]+B \cdot ud[k]$. The digital servo comprises a digital processor which outputs the second term $D \cdot ud[k]$ of the output equation by an analog circuit, and outputs the first term $C \cdot x[k]$ earlier for Ts/2. The digital servo also has a digital processor which executes the direct term of the output equation at period Ts/N (N is a 2 or higher natural number), which is 1/N of the basic operation period Ts, and updates the first term with the same delay time as the average delay time Ts/(2N) of the direct term. Also the digital servo has a digital processor which outputs the term $\alpha_0$ of the transfer function by the analog circuit, and outputs the other terms earlier for Ts/2. Also the digital servo has a digital processor which executes the term $\alpha_0$ of the transfer function at period Ts/N which is 1/N of the basic operation period Ts, and updates the other terms with the same delay time as the average delay time Ts/(2N) of the direct term.

20 Claims, 32 Drawing Sheets

DIGITAL SERVO CONTROL METHOD, DIGITAL SERVO CONTROLLER, STORAGE DEVICE AND HEAD POSITION CONTROL METHOD

This is a continuation of International PCT application no. PCT/JP01/02840 filed Mar. 30, 2001.

TECHNICAL FIELD

The present invention relates to a digital servo control method, digital servo controller, storage device, and head position control method for reading analog observation signals of the control target, performing digital processing, and generating control signals for the control target.

BACKGROUND ART

Servo controllers for servo-controlling a control target are widely used. Servo controllers are divided into analog servo controllers and digital servo controllers. An analog servo controller has many components, and a change in characteristics tends to occur due to the dispersion of characteristics of the components and age deterioration.

A digital servo controller, which performs digital processing using a processor, has fewer components, has an advantage in cost, has almost no characteristic changes, and allows characteristic resetting by rewriting the program. Therefore today digital servo controllers are used everywhere.

FIG. 29 is a block diagram depicting a conventional digital servo controller, and FIG. 30 is a block diagram depicting the processing of DSP thereof. FIG. 29 is a diagram depicting a configuration of a digital servo controller of a disk device where the observation signals for control are analog signals.

In FIG. 29, 15 are analog observation signals, such as head position information and acceleration information, and 10 is an A/D converter for converting analog signals into digital signals. 16 are digital observation signals converted by the A/D converter 10, and 11 is a DSP (Digital Signal Processor) which performs operations according to the program which has been set in advance. 17 are digital control signals for determining current to drive the head, and 12 is a D/A converter for converting digital signals into analog signals. 18 are analog control signals converted by the D/A converter 12, 14 is an amplifier for flowing predetermined current to the drive device of the head according to the voltage of the analog control signals, and 19 is a head drive current which flows to the head actuator.

Operation of the digital servo controller will now be described with reference to the processing blocks of the DSP 11 in FIG. 30. At first, the analog observation signals 15 are converted into the digital observation signals 16 by the A/D converter 10 at a certain computation period Ts. Then the DSP 11 performs processing in FIG. 30. In other words, the control signal 17 is computed by the following output equation and state equation.

Output equation: $yd[k]=C \cdot x[k]+D \cdot ud[k]$ (1)

State equation: $x[k+1]=A \cdot x[k]+B \cdot ud[k]$ (2)

Here ud[k]: an observation signal to be input to the controller 13,
yd[k]: a control signal to be output to the amplifier 14,
x[k]: an internal variable called a "state variable",
A, B, C, D: constant matrixes (set in advance),
k: a parameter to indicate the sampling time, which is k=0 at the start of control, and increases as k=1, 2, 3, . . . at each computation period Ts.

In other words, the DSP 11 calculates the above mentioned output equation (Formula 1) from the digital observation signal 16 and the $C \cdot x[k]$, which has been calculated at the previous computation period, and determines the digital control signal 17. Then the D/A converter 12 converts the digital control signal 17 into the analog control signal 18, outputs the analog control signal 18 to the amplifier 14 to be the drive current 19 of the head. Finally, the DSP 11 calculates the above mentioned state equation (Formula 2) from the digital control signal 16 and the internal variable x[k], determines x[k+1] to derive $C \cdot x[k+1]$ that is used at the next computation period.

By repeatedly executing the above operation at each computation period Ts, the position and the speed of the head are controlled according to the observation signal.

For the equation to implement the servo control system by a processor, a method for using a transfer function for internal processing of the DSP is available, in addition to the above mentioned method for using the state equation. FIG. 31 shows a block diagram depicting the internal processing of the DSP 11 when the following transfer function (Formula 3) is used.

$$\frac{y(z)}{u(z)} = \frac{\alpha_0 \cdot z^\wedge n + \alpha_1 \cdot z^\wedge(n-1) + \cdots + \alpha_{n-2} \cdot z^\wedge 1 + \alpha_{n-1}}{z^\wedge m + \beta_1 \cdot z^\wedge(m-1) + \ldots + \beta_{m-2} \cdot z^\wedge 1 + \beta_{m-1}} \quad (3)$$

In the formula (3), y(z): a control signal to be output to the amplifier 14, u(z): an observation signal to be input from the A/D converter 10, $\alpha i$, $\beta i$: constants, n, m: arbitrary integers, and z: a discrete time operator.

In the case of using this transfer function as well, in the digital controller in FIG. 29, the analog observation signal 15 is converted into the digital observation signal 16 by the A/D converter 10 at each predetermined computation period Ts. Then the DSP 11 calculates the above Formula (3) based on the digital observation signal 16, and determines the digital control signal 17. Then the digital control signal 17 is converted into the analog control signal 18 by the D/A converter 12, and the analog control signal 18 is output to the amplifier 14 to be the drive current 19 of the head.

Compared with an analog servo controller, which is composed only of such analog electric circuits as resistors and capacitors, this digital servo controller has such advantages as (1) the analog controller is comprised of many components, and is high in cost compared with a digital controller, (2) characteristic changes occur easily in the analog controller due to the dispersion of characteristics of the components and age deterioration, but such characteristic changes do not occur in a digital controller, and (3) with a digital controller, the characteristics of the controller can be reset by merely rewriting the program of the DSP, so the digital controller is flexible.

However, as FIG. 32 shows, the delay time ($\tau$+Ts/2) on average where Ts is the operation period of the DSP 11 and $\tau$ is the operation time from when the observation signal is detected to the output signal, is always generated in the digital servo controller, compared with an analog controller. The cause thereof will be described below.

For the term of $\tau$, in the case of the Formula (1), the second term $D \cdot ud[k]$ of the Formula (1) is called the "direct term", and is supposed to be reflected to the control signal y without a time difference with respect to the observation signal u. In the case of a digital controller, however, the control signal is output by the steps of [converting the observation signal u into a digital signal]→[operation by DSP]→[converting the control signal y into an analog signal]. Therefore time $\tau$, required for this processing, becomes the delay time.

For the term of Ts/2, in the digital controller, the analog control signal y(t), which is output at a certain time t, is held at a predetermined value during the operation period Ts of the DSP, so the analog control signal y(t) is not updated until (t+Ts). Therefore compared with an analog controller, which is sequentially updated according to the observation signal, the digital controller delays only for the operation time τ immediately after output, but delays τ+Ts at a point immediately before update. As a consequence, the delay time Ts/2 on average is generated.

In conventional control fields, delay time, which the digital controller has, has not been a major problem. This is because demand for control accuracy is not very high, and even an inexpensive DSP can implement operation period Ts and operation delay time τ, which are sufficiently short for the required precision.

Recently, however, high precision control is demanded for an inexpensive DSP which operation speed is relatively slow. For example, in the field of disk devices, very high precision control is demanded as the recording density increases. In a 20 GB optical disk, for example, the track pitch is about 0.5 μm, so a follow up control with about a 0.05 μm margin is demanded. Additionally, configuring a digital controller with an inexpensive DSP, which operation speed is slow, is also demanded to be successful in the low price competition among disk devices, so the delay time which occurs in digital control now cannot be ignored.

A solution method for the delay which occurs in digital control has been proposed in Japanese Patent Laid-open 10-149553, for example. This proposal is a method for separating the observation signal for control into a high frequency area component and a low frequency area component using a high pass filter and a low pass filter comprised of analog circuits, then performing gain adjustment and phase compensation by analog control for the high frequency area component, and by digital control using DSP for the low frequency area component, so as to decrease the phase delay caused by the processing of DSP.

This method, however, requires many analog circuits, such as a high pass filter, low pass filter, gain adjustment circuit, and phase compensation circuit, which is very disadvantageous in terms of cost.

Also in control, where attenuating the unnecessary resonance of the control target is important, the method of processing the high frequency area, where unnecessary resonance occurs frequently, by analog control, loses many of the merits acquired by using a digital controller (no characteristic changes, flexibility). In other words, in analog processing, considering characteristic changes depending on the individual component and due to age deterioration, as mentioned above, performing analog processing for a high frequency area where unnecessary resonance frequently occurs takes time to implement adjustments to suppress resonance, and it is difficult to suppress resonance due to age deterioration. Also there is no flexibility, so an analog circuit must be designed individually for each control target for which the resonance point is different.

DISCLOSURE OF THE INVENTION

With the foregoing in view, it is an object of the present invention to provide a digital servo control method, digital servo controller, storage device, and head position control method for performing high precision control by an inexpensive processor by decreasing the control delay caused by digital processing.

It is another object of the present invention to provide a digital servo control method, digital servo controller, storage device, and head position control method for performing high precision control by an inexpensive processor, decreasing the control delay caused by digital processing while maintaining the advantage of digital control.

It is still another object of the present invention to provide a digital servo control method, digital servo controller, storage device and head position control method by an inexpensive processor, decreasing the control delay caused by digital processing while attenuating unnecessary resonance with an inexpensive configuration.

To achieve these objects, one aspect of the present invention is a digital servo control method for receiving an analog observation signal ud from a control target and generating a control signal to servo-control the control target using the following output equation and state equation, comprising a step of multiplying the analog observation signal u(t) by D using an analog amplifier, a step of converting the analog observation signal u(t) into digital observation signal ud[k] by an A/D converter at each operation period Ts, calculating the above mentioned state equation by a processor, and calculating C·x[k+1] of the above mentioned output equation based on the result x[k+1] of the calculation of the state equation, a step of outputting the calculated value of C·x[k+1] to a D/A converter at a point when Ts/2 has elapsed since the analog observation signal u(t) is observed, and a step of adding the above mentioned analog observation signal multiplied by D and the output of the D/A converter, and outputting the control signal y(t).

Output equation: $yd[k]=C \cdot x[k+1]+D \cdot ud[k]$

State equation: $x[k+1]=A \cdot x[k]+B \cdot ud[k]$

Here, ud [k]: an observation signal to be input, yd[k]: a control signal to be output, x[k]: a state variable, A, B, C, D: a constant matrixes, and k: a parameter to indicate a sampling time.

In this aspect of the present invention, the second term D·ud[k] (hereafter called the direct term) of the output equation is output by the analog circuit, and the first term C·x[k] is output earlier for only Ts/2, so the average delay time of a respective signal can be 0, the delay caused by digital processing can be prevented, and high precision digital control by an inexpensive processor. becomes possible.

Another aspect of the present invention is a digital servo control method for receiving an analog observation signal ud from a control target, and generating control signals to servo-control the control target using a following output equation and state equation, comprising a step of converting the analog observation signal u(t) into a digital signal by an A/D converter at each operation period Ts/N (N is a 2 or higher natural number), and calculating D·ud[k] of the following output equation by a processor, a step of calculating the following state equation at each operation period Ts by a processor, and calculating C·x[k+1] of the following output equation based on the result x[k+1] of the calculation of the state equation, a step of calculating the control signal yd[k] each time the above D·ud[k] and C·x[k+1] are updated, and a step of outputting the calculated yd[k] to a D/A converter and outputting the analog control signal y(t).

Output equation: $yd[k]=C \cdot x[k]+D \cdot ud[k]$

State equation: $x[k+1]=A \cdot x[k]+B \cdot ud[k]$

Here, ud[k]: an observation signal to be input, yd[k]: a control signal to be output, x[k]: a state variable, A, B, C, D: constant matrixes, and k: a parameter to indicate sampling time.

In this aspect of the present invention, the direct term of the output equation is executed at Ts/N period (N is a 2 or higher natural number) which is 1/N of the basic operation period Ts, and the first term of the output equation is updated with the same delay time as the average delay time Ts/(2N), which is the direct term has, thereby the average delay time of the control signals can be τ+Ts/(2N), delay caused by digital processing can be decreased, and high precision digital control by an inexpensive processor becomes possible.

Still another aspect of the present invention is a digital servo control method comprising a step of converting the analog observation signal into a digital observation signal u[z] by an A/D converter at each operation period Ts, calculating the terms other than the term $\alpha_0$ of the following transfer equation by a processor, and outputting the result to a D/A converter, a step of multiplying the analog observation signal by $\alpha_0$, and a step of adding the analog observation signal multiplied by $\alpha_0$ and the output of the D/A converter, and outputting a control signal y(z).

$$\frac{y(z)}{u(z)} = \frac{\alpha_0 \cdot z^{\wedge}n + \alpha_1 \cdot z^{\wedge}(n-1) + \cdots + \alpha_{n-2} \cdot z^{\wedge}1 + \alpha_{n-1}}{z^{\wedge}m + \beta_1 \cdot z^{\wedge}(m-1) + \ldots + \beta_{m-2} \cdot z^{\wedge}1 + \beta_{m-1}} \quad (3)$$

(where y(z) is a control signal to be output to the amplifier 6, u(z) is an observation signal to be input from the A/D converter, αi and βi are constants, n and m are arbitrary integers, and z is a discrete time operator.)

In this aspect of the present invention, only the term $\alpha_0$ of the equation based on the transfer function is implemented by an analog circuit, and the operation results of the other terms are output earlier for Ts/2 compared with a conventional method, and both results are added by the analog circuit. By this, the delay time τ+Ts/2, which occurs in a conventional digital controller, can be 0.

Now the term $\alpha_0$ and the other terms will be separately described.

Term $\alpha_0$: In a conventional method, the term $\alpha_0$ is processed in the operation by DSP, so the delay time τ+Ts/2 occurs, but the delay time does not occur since the processing of the term $\alpha_0$ is implemented by the analog circuit.

Other terms: Terms other than $\alpha_0$ are calculated based on the observation signals in the past and the control signals in the past. Therefore the calculation results of these terms can be output earlier for Ts−[operation time] at the maximum. So by outputting the calculation result earlier for Ts/2 compared with a conventional method, the delay time can be 0.

Since the delay time of the term $\alpha_0$ and the other terms are 0, the delay time of the control output when both are added by the analog circuit can also be 0. Therefore an integration circuit and differentiation circuit are not required, unlike an analog controller, and only an amplification circuit and addition circuit are required, so cost can be low, and also the major part of the controller is implemented by a digital controller, so flexibility is not lost.

In another aspect of the present invention, the above mentioned output step is further comprised of a step of performing calculation for all the terms other than the term $\alpha_0$, by the processor.

Another aspect of the present invention is a digital servo control method for receiving an analog observation signal from a control target and generating a control signal to servo-control the control target using the following transfer equation, comprising a step of converting the analog observation signal into a digital signal by an A/D converter at each operation period Ts/N (N is a 2 or higher natural number), and calculating the term $\alpha_0$ of the following transfer equation by a processor, a step of calculating terms other than the term of $\alpha_0$ of the following transfer equation at each operation period Ts, and a step of adding the calculation result of the term $\alpha_0$ and the calculation result of terms other than the term $\alpha_0$ at the Ts/N period, outputting the result to a D/A converter, and outputting an analog control signal y(z).

$$\frac{y(z)}{u(z)} = \frac{\alpha_0 \cdot z^{\wedge}n + \alpha_1 \cdot z^{\wedge}(n-1) + \cdots + \alpha_{n-2} \cdot z^{\wedge}1 + \alpha_{n-1}}{z^{\wedge}m + \beta_1 \cdot z^{\wedge}(m-1) + \ldots + \beta_{m-2} \cdot z^{\wedge}1 + \beta_{m-1}} \quad (3)$$

(where y(z) is a control signal to be output to the amplifier 6, u(z) is an observation signal to be input from the A/D converter, αi and βi are constants, n and m are arbitrary integers, and z is a discrete time operator.)

In this aspect of the present invention, only the term $\alpha_0$ of the Formula (3) is calculated at 1/N of the regular period, and the operation results of the other terms are updated synchronizing with the delay time of the term $\alpha_0$, so the delay time τ+Ts/2, which occurs in a conventional digital controller, can be τ+Ts/(2N).

Now the term $\alpha_0$ and the other terms will be separately described.

Term $\alpha_0$: the delay time τ+Ts/2, which occurs in a conventional method, can be τ+Ts/(2N) by multiplying the operation period by 1/N.

Other terms: terms other than $\alpha_0$ are calculated based on the observation signals in the past and the control signals in the past. Therefore the calculation results of these terms can be output earlier for Ts−[operation time] at the maximum. So by updating the calculating result synchronizing with the delay time of the term of $\alpha_0$, the delay time can be τ+Ts/(2N).

Since the delay time of the term $\alpha_0$ and the other terms are τ+Ts/(2N), the delay time of the control output when both are added as well can be τ+Ts/(2N). By calculating the term of $\alpha_0$ at a period when the normal period is multiplied by N, the delay time, which was τ+Ts/2 which occurs in a conventional digital controller, can be τ+Ts/(2N).

BEST MODE FOR CARRYING OUT THE INVENTION

Embodiments of the present invention will now be described in the sequence of the storage device, first embodiment, second embodiment, example, third embodiment, fourth embodiment, fifth embodiment, other examples, and other embodiments.

[Storage Device]

Figure 1:
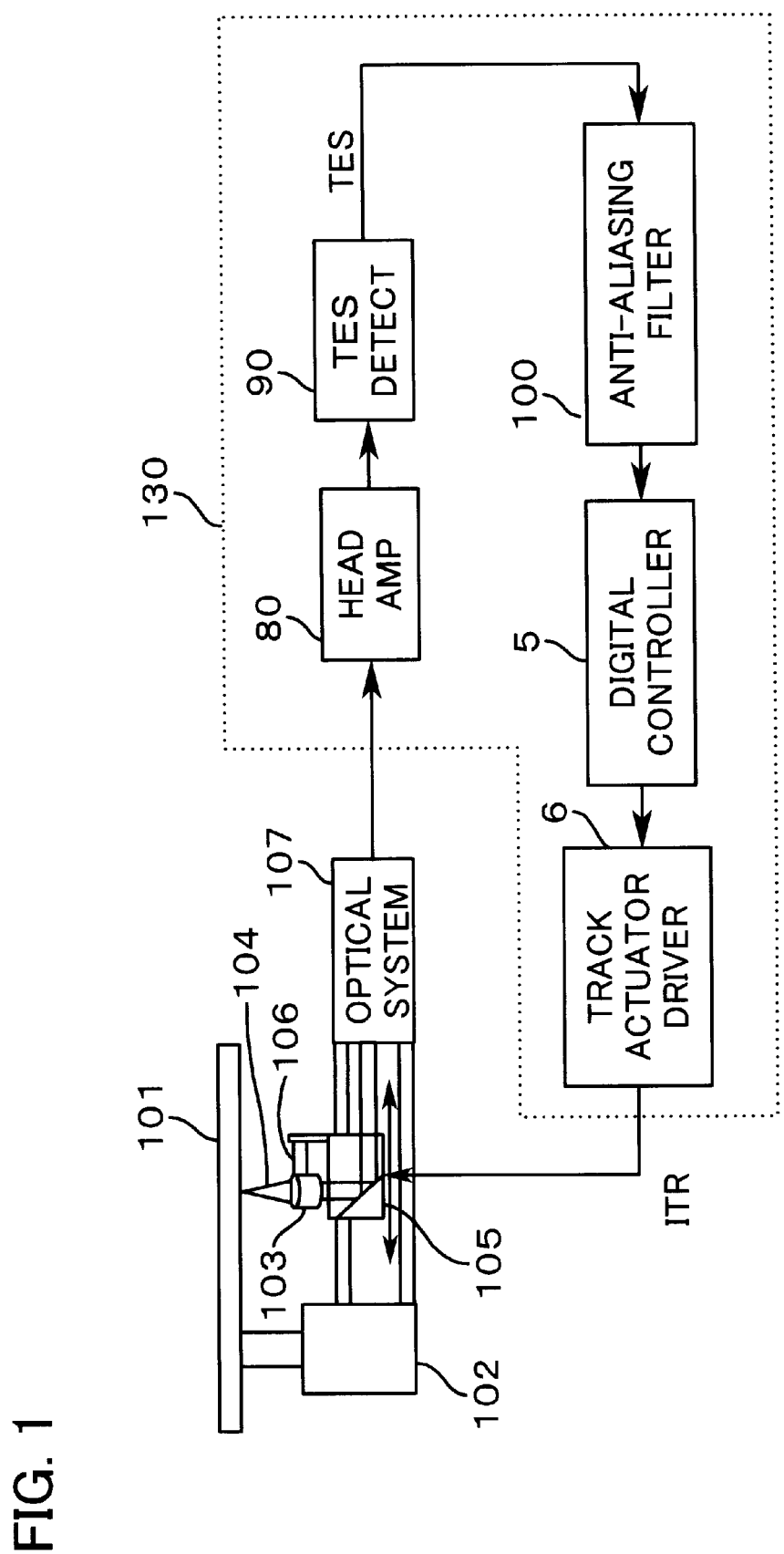
FIG. 1 is a diagram depicting a configuration of a disk controller according to an embodiment of the present invention.

FIG. 1 is a diagram depicting a configuration of a storage device according to an embodiment of the present invention, where a magneto-optical disk device is shown as a disk device. Here components which are not directly related to the description of the present embodiments, such as a regeneration signal processing circuit, interface circuit with host computer, and focus control circuit, are omitted.

As FIG. 1 shows, the optical disk device, where an optical disk 101 on which information tracks for recording information are provided, is set, has a spindle motor 102 which rotates and drives the optical disk 101. The optical disk device, which is a composing element of an optical head for recording and regenerating information on the optical disk 101, comprises an objective lens 103 for irradiating an optical beam 104 onto the information tracks of the optical disk 101, a focus actuator 106 which is a focus moving means for driving the objective lens 103 in the optical axis direction (vertical direction in FIG. 1, that is the focusing direction), a carriage (actuator) 105 which the objective lens 103 and the focus actuator 106 are mounted on and which can move in the radius direction of the optical disk 101, and an optical system 107 which includes a laser diode to be a light source and a photo-detector.

The tracking control circuit 130 comprises a head amplifier 80 for amplifying the output current of the photo-detector, a tracking error signal detection circuit (TES detection circuit) 90 for detecting the tracking error signal by the output of the photo-detector, a low pass filter (anti-aliasing filter) 100 for removing the high frequency component of TES to stabilize the tracking control system, a digital servo controller 5 for generating servo control signals from the tracking error signal, and a tracking actuator driver (amplifier) 6 for supplying drive current to the coil used for driving the carriage 5 based on the output signal of the digital servo controller 5.

This carriage 105 can move, along with the objective lens 103 and the focus actuator 106 by the drive current ITR supplied from the tracking actuator driver 6, in a direction crossing the information tracks on the optical disk 101 (horizontal direction in FIG. 1, that is the tracking direction), so that the optical beam 104 can irradiate onto all the information tracks. The carriage 105 has a voice coil motor, for example.

In this configuration of the carriage 105, the focus actuator 106, for example, is comprised of a holder for securing the objective lens 103, a plate spring for supporting the objective lens 103 so as to be movable in the focusing direction, and be roughly secured in the tracking direction, and a focus coil for driving the objective lens 103. And the carriage 105 has the focus actuator 106 on top, and tracking coils on both sides as the carriage drive means for driving the carriage.

By configuring the optical head by installing the carriage 105 in such a configuration together with the guide axis and the magnetic circuit along the carriage 105, the focus actuator 106 can be driven in the focusing direction when power is supplied to the focus coil, and the carriage 105 can be driven in the tracking direction when power is supplied to the tracking coil. Since the optical beam 104 is also driven in the tracking direction when the carriage 105 is driven, the tracking actuator is configured by these components.

Also as described later, the digital servo controller 5 is comprised of an AD converter for converting the analog track error signal TES, which is an observation signal, into a digital value, DSP (Digital Signal Processor) for processing digital value signals, and a DA converter for converting the digital drive voltage of the DSP into analog drive voltage.

Now the operation of the tracking control system in this configuration will be described. At first, the spindle motor 102 is rotated at a predetermined speed by the motor control circuit, which is not illustrated here, and a laser diode included in the optical system 107 is light-emitted at a predetermined output by the drive control of a laser control circuit, which is also not illustrated.

Then the focus actuator 106 is driven and controlled by the focus control circuit, which is not illustrated, and the position of the objective lens 103 in the focusing direction is controlled so that the optical beam 104 focuses on an information track of the optical disk 101. The reflected light from the optical disk 101 of the optical beam 104 is received by the photo-detector of the optical system 107, is amplified by the head amplifier 80, and is output to the tracking error signal detection. circuit 90.

In this state, the tracking error signal detection circuit 90 generates the tracking error signal TES, which indicates how far the irradiating position of the optical beam 104 has deviated from the center of an information track, based on the output of the photo-detector. Normally the tracking error signal becomes zero level at the center of an information track and at about center point between tracks, and becomes a signal which sine wave changes with respect to the displacement of the optical beam.

The tracking error signal, which is output from the tracking error signal detection circuit 90, is servo-operation processed by the digital servo controller 5 after the high frequency component (noise component) is removed by the low pass filter 100, then is negatively fed back to the carriage 105 by the tracking actuator driver 6 as drive current ITR. By this drive current ITR, the carriage 105 is driven to the direction to correct the displacement of the optical beam 104 detected by the tracking error signal detection circuit 90.

By feeding back the tracking error signal to the tracking coil for driving the carriage in this way, the optical beam 104 is driven in the tracking direction to a position where the tracking error signal becomes zero, and tracking control is performed so that the optical beam 104 follows up to the center of the information track.

The disk device was described using an optical disk (including a magneto-optical disk) device, but the present invention can be applied to other disk devices, such as a magnetic disk device.

[First Embodiment]

Figure 2:
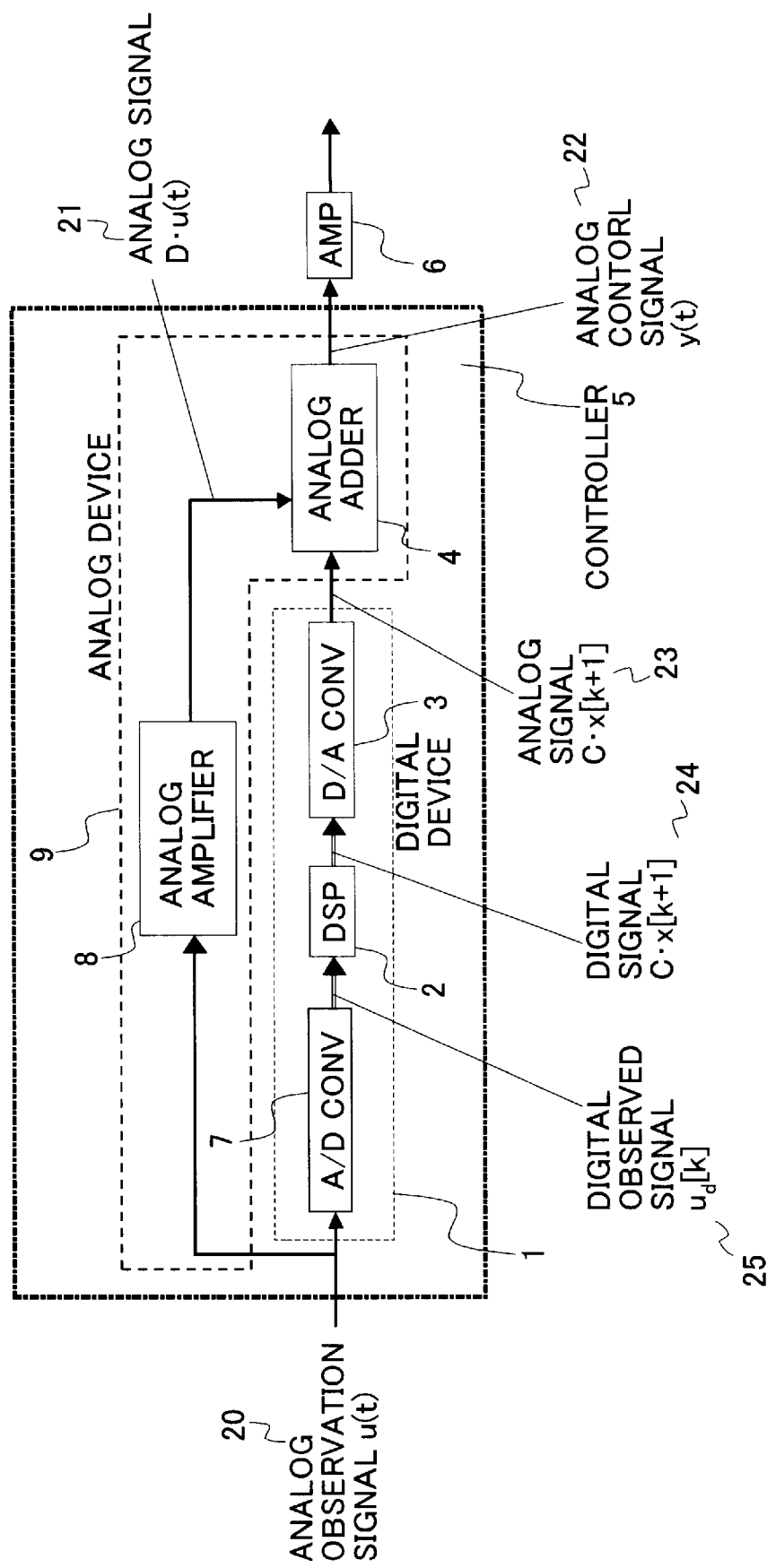
FIG. 2 is a block diagram depicting a digital servo controller according to the first embodiment of the present invention.
Figure 3:
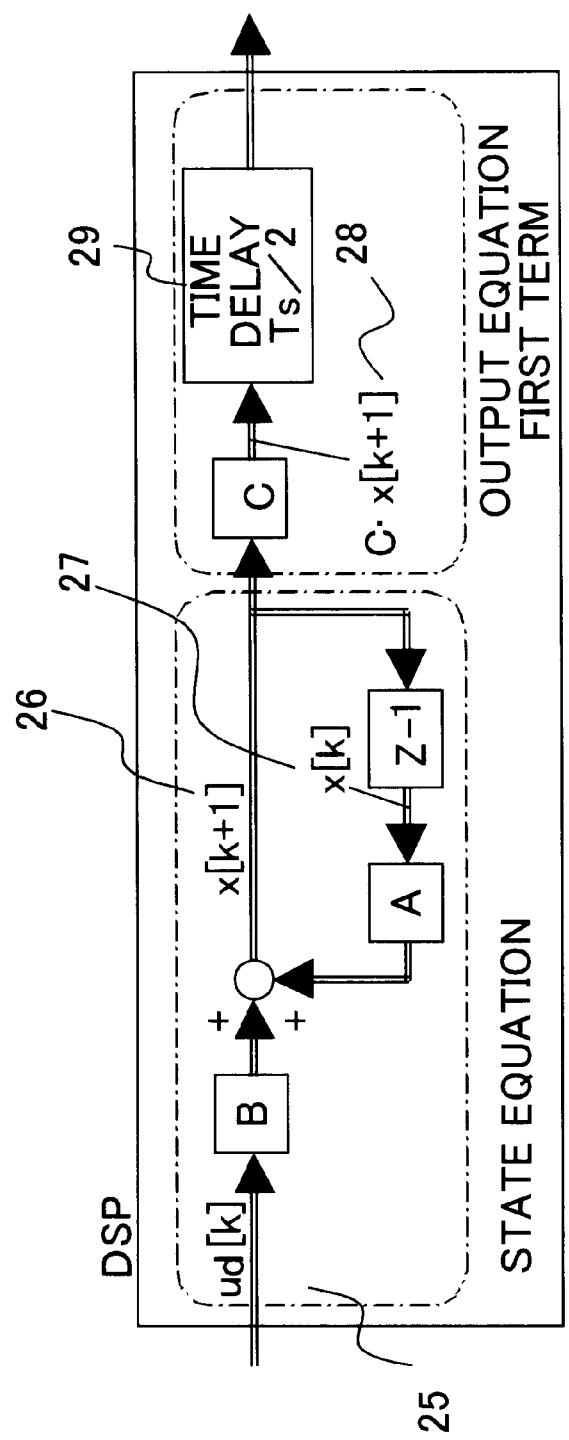
FIG. 3 is a block diagram depicting the processing inside DSP according to the first embodiment in FIG. 2.

FIG. 2 is a diagram depicting a configuration of a digital controller according to the first embodiment of the present invention, and FIG. 3 is a block diagram depicting the processing of the DSP thereof.

As FIG. 2 shows, the controller (digital servo controller) 5 is comprised of a digital device 1 and the analog device 9. The digital device 1 is comprised of an A/D converter 7 which converts the analog observation signal 20, such as the position information and acceleration information of the head, into a digital signal 25, a DSP (Digital Signal Processor) 2 which performs operations according to the program which has been set in advance, and a D/A converter 3 which converts the digital control signal 24, for deciding current to drive the head of the DSP 2, into the analog signal 24.

The analog device 9 is comprised of an analog amplification circuit 8 for analog-amplifying the analog observation signal 20, and an analog addition circuit 4 for adding the amplified analog signal 21 and the analog signal 23 of the digital device 1. The amplifier 6 flows a predetermined current to the actuator 105 of the head according to the voltage of the analog control signal 22 from the analog addition circuit 4.

The controller 5, which is comprised of the analog device 9 and the digital device 1, operates the analog control signal 22 by the output equation and state equation, similar to those mentioned above. In other words, the output equation and state equation are as follows.

Output equation: $y[t]=C \cdot x[k+1]+D \cdot u[t]$ (3)

State equation: $x[k+1]=A \cdot x[k]+B \cdot ud[k]$ (4)

Here, u[t]: an observation signal to be input to the controller 5, ud[k]: a digital observation signal to be input to DSP 2, yd[k]: a control signal to be output to the amplifier 6, x[k]: an internal variable called the state variable, A, B, C, D: constant matrixes (set in advance), and k: a parameter to indicate the sampling time, which is k=0 at control start time and which increases as k=1, 2, 3, . . . at each operation period Ts.

This operation will now be described.

(1) At first, the analog observation signal u(t) 20 is amplified by "D" by the analog amplification circuit 8, so as to obtain the analog signal D·u(t) 21 of the direct term of the output equation (3). In this method, digital processing is not performed, so the delay time can be "0".

(2) Then in the digital device 3, the DSP 2 performs the processing shown in FIG. 3. First the DSP 2 calculates C·x[k+1] 28. In other words, x[k+1] 26 can be calculated at the time of the previous sampling point [k] by the state equation (4). This means that at the operation period start point, the value ud[k] 25, which is a value when the analog observation signal u(t) 20 is converted into a digital signal, is read from the A/D converter 7. Then the above mentioned state equation (4) is calculated from the x[k] 27 and ud[k] 25 which has been calculated at the previous sampling time [k]. C·x[k+1] 28 is calculated based on the result x[k+1] 26.

Then C·x[k+1] 28 is output. In other words, when the operation period is Ts, the value C·x[k+1] 28 is output to the D/A converter 3, and is converted into the analog signal at a point when Ts/2 has elapsed after reading ud[k] 25. The term of C·x[k+1] 28 is actually a value to be reflected on the control signal when Ts has elapsed since reading ud[k] 25. So in this method, C·x[k+1] 28 is output earlier for Ts/2, and as a result, the delay time in the term of Ts/2 is canceled. Also there is a margin for Ts/2 as a time to perform the operation, so the term of τ can be 0, and the delay time becomes 0.

(3) The control signal y(t) 22 is output. In other words, the analog signal D·u(t) 21 in (1) and the analog signal C·x[k+1] 23 in (2) are added by the analog addition circuit 4, and the result is output to the amplifier 6 as the control signal y(t) 22.

By outputting the control signal by such a method, the average delay time of the control signal can be "0."

When the number of the observation signals is Nu and the number of the control signals is Ny, only Nu×Ny number of analog amplification circuits and analog addition circuits are required to implement this embodiment. Generally, the number of the observation signals and the control signals of a disk device is two at most, and in this case, only one amplification circuit and one addition circuit are added respectively, so the disk device can be implemented at a very low cost, compared with the case of when the disk device is completely configured by analog controllers. Also compared with a digital device which processes the high frequency component that is analog, a change in the resonance suppressing function caused by a change in characteristics can be prevented.

Figure 4:
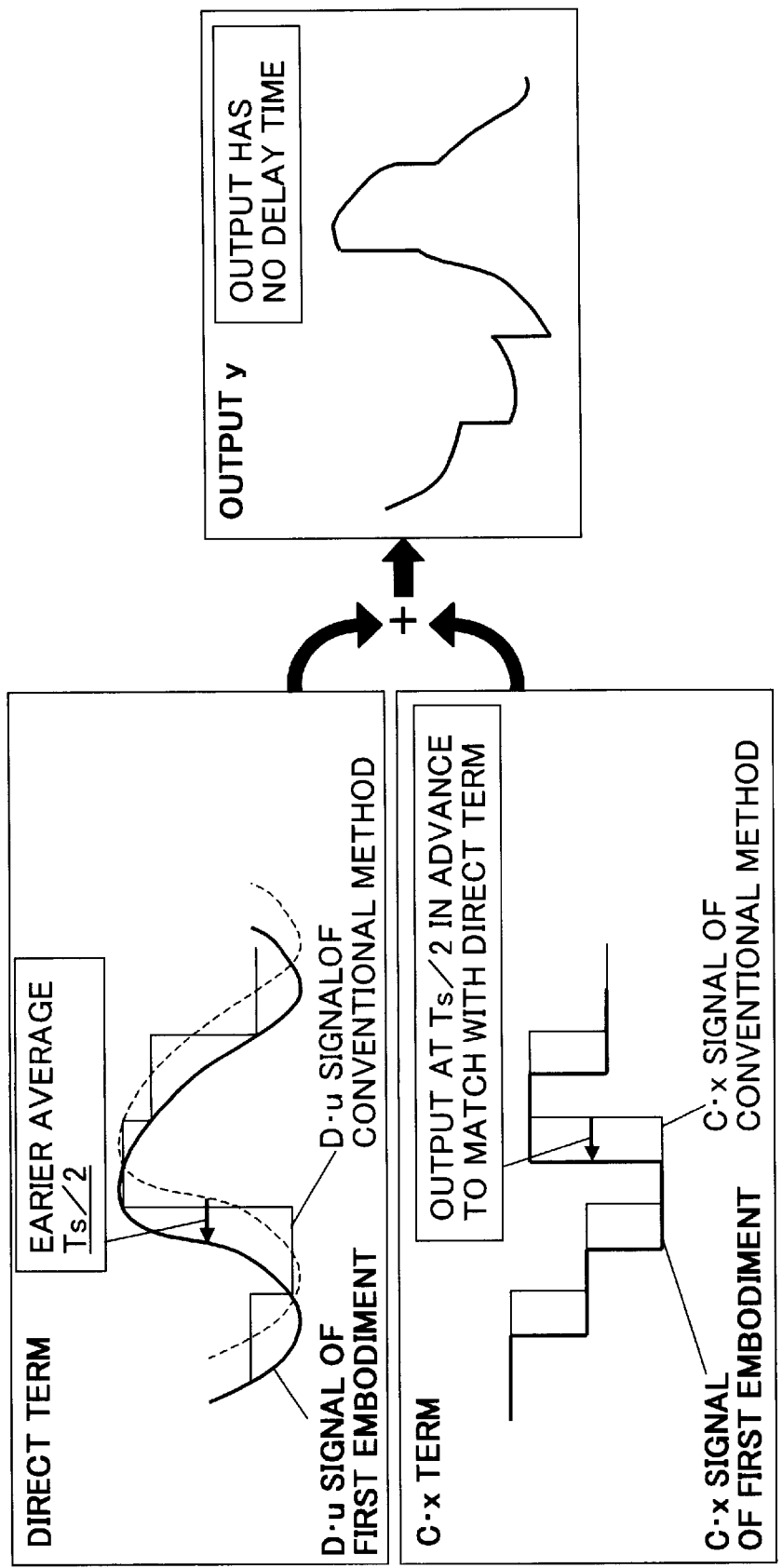
FIG. 4 is a diagram depicting the operation in the configuration in FIG. 2.

FIG. 4 is a diagram depicting the signal waveform of the direct term D·u and the signal waveform of C·x of the first embodiment, compared with the case of a conventional digital controller. For the signal waveform of the direct term (upper left in FIG. 4), an analog circuit is used in the first embodiment, so a delay time is not generated and a signal is output earlier for Ts/2 on average, compared with a conventional device.

For the signal waveform of the C·x term (lower left in FIG. 4), time from observing the observation signal u[k] at a certain point of time until reflecting the C·x[k+1] on output is Ts in a conventional method. Whereas according to the first embodiment, there is no delay time of the direct term, and output is earlier for Ts/2 compared with the conventional method, so C·x[k+1] is output earlier for Ts/2. In other words, the time from observing u[k] to reflecting C·x[k+1] on output is Ts/2.

Since both the signal of the direct term D·u and the signal of C·x are output earlier for Ts/2 compared with a conventional method, the control signal y, which is a value when the signal of D·u and signal of C·x are added, is also output earlier for Ts/2 compared with a conventional method, therefore the output does not have a delay time.

[Second Embodiment]

Figure 5:
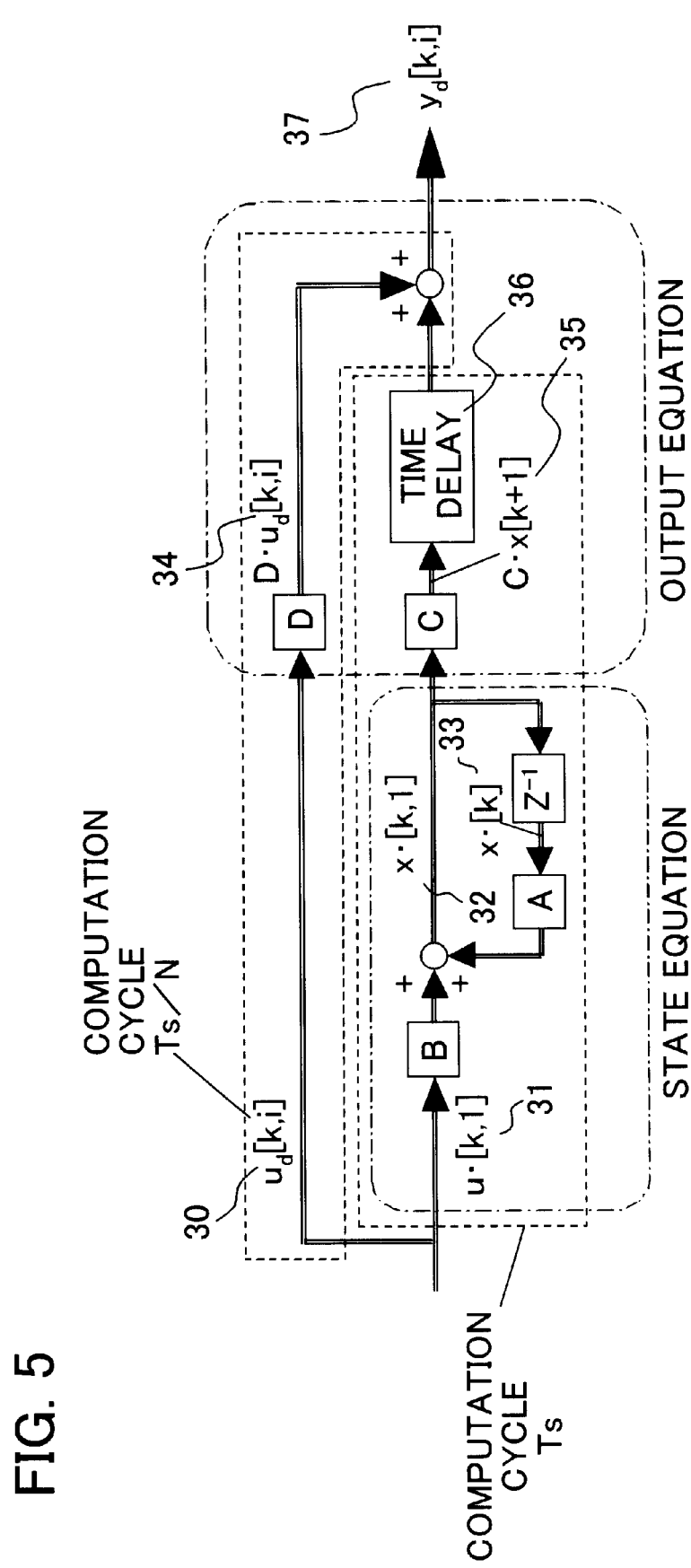
FIG. 5 is a block diagram depicting the processing of DSP of the digital servo controller according to the second embodiment of the present invention.
Figure 6:
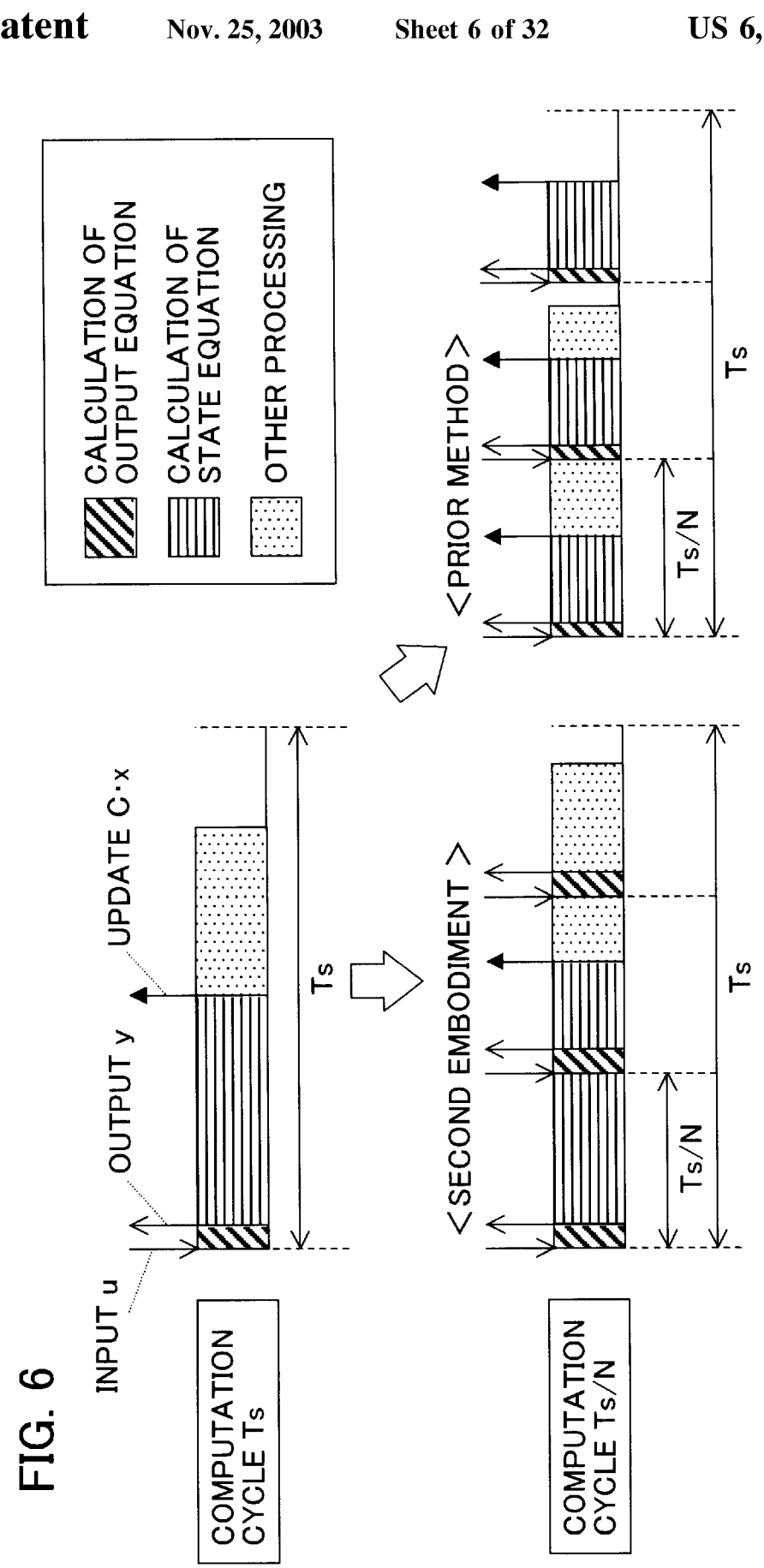
FIG. 6 is a diagram depicting the operation of the second embodiment in FIG. 5.
Figure 7:
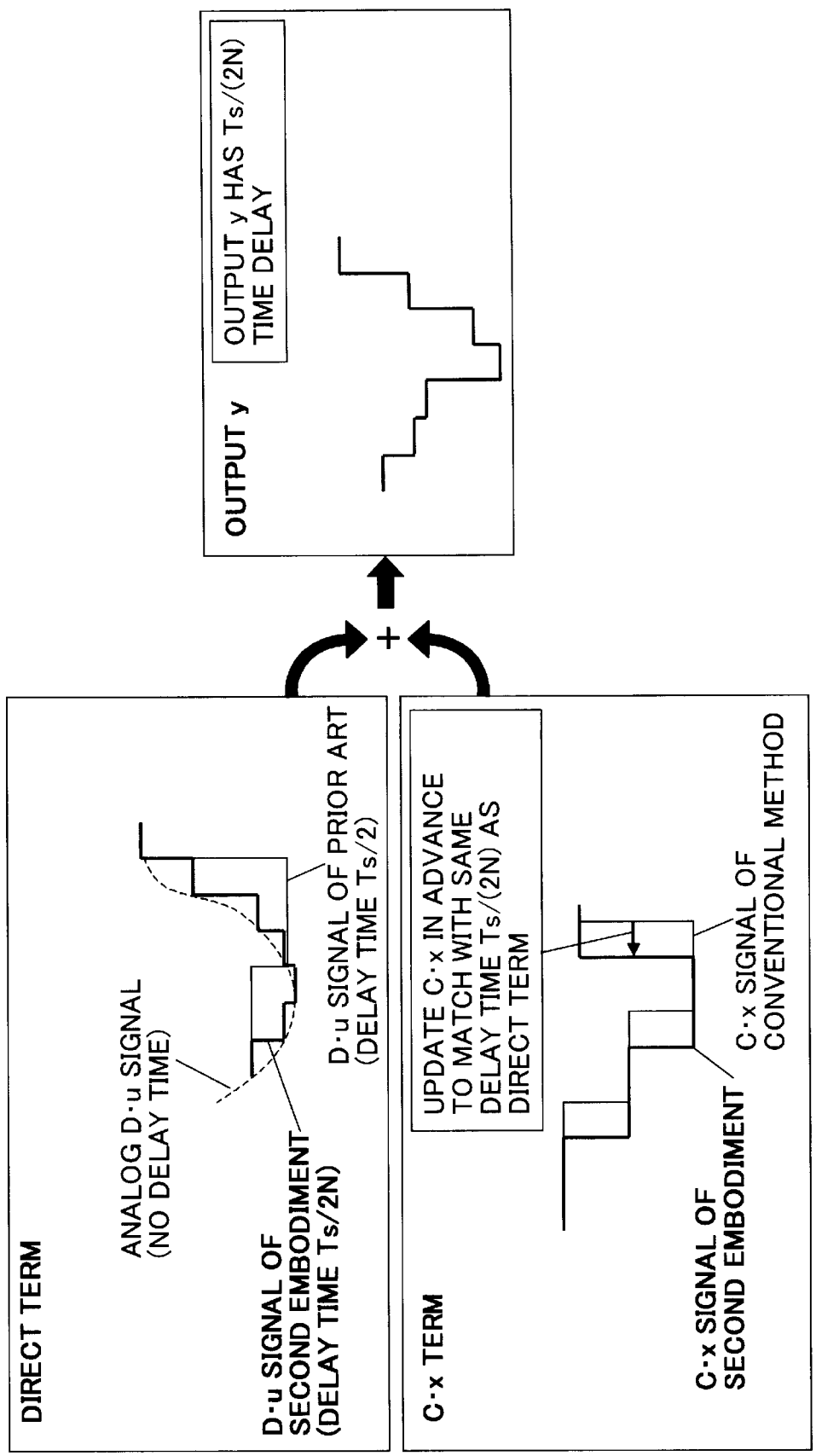
FIG. 7 is a diagram depicting the processing operation of DSP in the configuration in FIG. 5.

FIG. 5 is a block diagram depicting the processing of DSP according to the second embodiment of the present invention, FIG. 6 is a diagram depicting the arithmetic processing thereof, and FIG. 7 is a diagram depicting the operation thereof. In this embodiment, the controller 5 is comprised of only the digital device 1, and FIG. 5 shows the processing of the DSP 2. In other words, the digital device 1 is comprised of an A/D converter 7, which converts the analog observation signal 20, such as the position information and acceleration information of the head, into the digital signal 25, a DSP (Digital Signal Processor) 2 which performs operation according to the program which has been set in advance, and a D/A converter 3 which converts the digital control signal 24, for deciding the current to drive the head of the DSP 2, into analog signal 23.

The controller 5, which is comprised of the digital device 1, operates the digital control signal 37 by the output equation and state equation similar to that mentioned above. In other words, the output equation and the state equation are as follows.

Output equation: $yd[k,i]=C·x[k+1]+D·ud[k,i]$ (5)

State equation: $x[k+1]=A·x[k]+B·ud[k,i]$ (6)

Here, ud[k,i]: a digital observation signal to be input to DSP 2, yd[k,i]: a digital control signal to be output to amplifier 6, x[k]: an internal variable called the state variable, A, B, C, D: constant matrixes (set in advance), k: a parameter to indicate the sampling time which is k=0 at the control start time and which increases as k=1, 2, 3, . . . at each operation period Ts.

In the present embodiment, the direct term of the output equation (5) is executed at period Ts/N, which is 1/N of the basic operation period Ts (N is a 2 or more natural number), and the first term of the output equation is updated with a delay time the same as the average delay time Ts/(2N) which the direct term has, so that the average delay time of the control signal can be τ+Ts/(2N). Now details of each term will be described.

At first, the direct term of the output equation (5) is calculated. In other words, when the basic operation period is Ts, the analog observation signal u(t) 20 is converted into the digital observation signal ud[k,i] 30 (FIG. 5) by the A/D converter 7 (see FIG. 2) at the period of Ts/N, and the result is multiplied by the constant D, to calculate D·ud[k,i] 34. Here i=1–N, and the digital observation signal at the start time of the basic operation period Ts is ud[k,1] 31.

Now the output equation C·x[k+1] 35 is calculated. In other words, x[k+1] 32 is calculated at the time of the previous sampling point [k] using the state equation (6). This means that the value ud[k,1] 31, which is a value when the analog observation signal u(t) 20 is converted into the digital signal, is read from the A/D converter 7 at the start point of the operation period. Then the above mentioned state equation (6) is calculated from the x[k] 33 and ud[k,1] 31 which has been calculated at the previous sampling times [k]. C·x[k+1] 35 is calculated based on the result x[k+1] 32.

Then the control signal y[k,i] 37 is calculated and output as follows.

(1) When N is an odd number:
When the time elapsed since ud[k,1] 31 is read is td, yd[k,i]=C·x[k]+D·ud[k,i] is calculated at the period of Ts/N while td<Ts/2.
While td>Ts/2, on the other hand, yd[k,i]=C·x[k+1]+D·ud[k,i] is calculated at the period of Ts/N. The calculation result is converted into the analog control signal y(t) 18 by the D/A converter 3, and is then output to the amplifier 6.

(2) When N is an even number:
When the time elapsed since ud[k,i] 31 is read is td, yd[k,i]=C·[k]+D·ud[k,i] is calculated at the period of Ts/N while td≦Ts/2. When td=Ts/2+Ts/(2N), yd[k,i]=C·x[k+1]+Dud[k,N/2+1] is calculated. In other words, at this point, C·x is updated and yd [k,i] is calculated and output. While td>Ts/2+Ts/(2N), yd[k,i]=C·x[k+1]+D·ud[k,i] is calculated at the period of Ts/N. The calculation result is converted into the analog signal y(t) 18 by the D/A converter 3, and is then output to the amplifier 6.

In this embodiment, the direct term is calculated at the operation period Ts/N, so the average delay time is Ts/(2N). And the term of C·x[k+1] 35 is updated at the point of Ts/2+Ts/(2N) after reading ud[k,1] 31 whether N is an even number or odd number, so the average delay time is still Ts/(2N). Therefore the control signal y[k,i] 37 to be output is τ+Ts/(2N) considering the delay time due to the operation. This is a delay time equivalent to when a conventional high-speed digital controller is executed at operation period Ts/N.

Compared with the case of executing a digital controller at the operation period Ts by a conventional method, the number of operations required to increase for executing the second embodiment is Nu×Ny×(N−1) times of multiplication, where Nu is the number of observation signals and Ny is the number of control signals, and the number of additions, the same as the number of multiplications. Generally the number of observation signals and the control signals of a disk device is about 2 at most, so in this case, only N−1 times of multiplication and addition increases, so compared with the case of executing all the operations at the operation period Ts/N, the number of operations to execute is extremely small, and the disk device can be implemented with an inexpensive DSP.

FIG. 7 is a diagram depicting the signal waveform of the direct term D·u and the signal waveform of C·x of the second embodiment compared with the case of a conventional digital controller.

For the signal waveform of the direct term (upper left in FIG. 7), the conventional waveform has the delay time Ts/2, but the waveform of the second embodiment has the delay time Ts/(2N).

For the signal waveform of the term C·x (lower left in FIG. 7), time from observing the observation signal u[k] at a certain point of time until reflecting the C·x[k+1] on output is Ts in a conventional method. Whereas according to the second embodiment, C·x[k+1] is output earlier for Ts/2−Ts/(2N) corresponding to the delay time of the direct term which becomes Ts/(2N). In other words, the time from observing u[k] to reflecting C·x[k+1] on output is Ts/2+Ts/(2N).

Since both the signal of the direct term D·u and the signal of C·x are output earlier for Ts/2−Ts/(2N) compared with a conventional method, the control signal y, which is a value when the signal D·u and the signal C·x are added, is also output earlier for (Ts/2−Ts/(2N)) compared with a conventional method, therefore the delay time of output becomes Ts/2N.

FIG. 6 is a conceptual diagram depicting the operation time of DSP in the second embodiment. When the operation period is Ts in a conventional method (top in FIG. 6), the observation signal u is read first, and based on this, the output equation is calculated and the control signal y is output. Then the state equation is calculated and the value of C·x is updated.

When the operation period is Ts/N in this conventional method (lower right in FIG. 6), it is needless to say that the same processing must be completely executed during the time Ts/N, and a more expensive DSP with a faster operation speed is required compared with the case of the period Ts.

In the case of using the second embodiment (lower left in FIG. 6), however, only the output equation is calculated N times during Ts, and the state equation is calculated only once during Ts. The output equation has a much less calculation volume compared with the state equation, and the calculation volume does not differ much compared with the case of a conventional method at the operation period Ts (top in FIG. 6). So the digital device can be implemented with a relatively inexpensive DSP which operation speed is slow, and the delay time can be the same as that of a conventional method at the operation period Ts/N (lower right in FIG. 6).

EXAMPLES

Example 1

As an example of the first embodiment, a digital controller which has the transfer characteristic indicated by the bold line in FIG. 8 was implemented by the above mentioned method of the first embodiment, and was executed by simulation, which will be described below. For comparison, the result when the digital controller having the same transfer characteristic was implemented by a conventional method, and the simulation result of the analog controller which has the transfer characteristic indicated by the fine line, are also shown.

Figure 8:
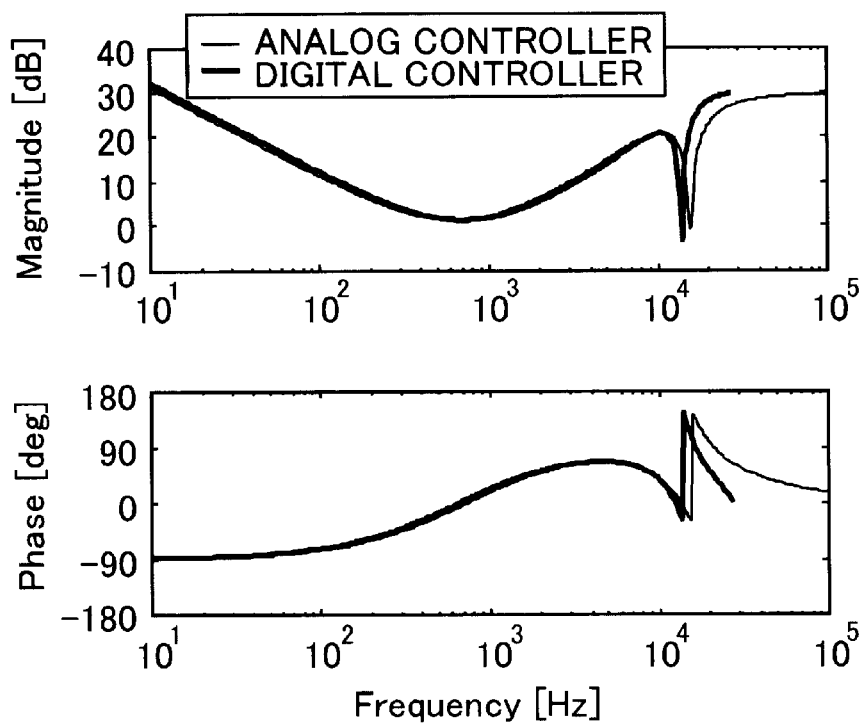
FIG. 8 is a transfer characteristic diagram of a controller according to an example of the present invention.

The configuration of the analog controller in FIG. 8 is

[1] primary phase delay compensator where the pole is 0 [Hz] and the zero point is 500 [Hz],
[2] primary phase advancement compensator where the pole is 11.2 [kHZ] and the zero point is 800 [Hz],
[3] primary phase advancement compensator where the pole is 13.9 [Hz] and the zero point is 4.6 [kHz],
[4] notch filter expressed by (s2+ωn2)/(s2+2ζωn+wn2), (where ωn=15.5 [kHz], ζ=0.3). This is expressed by a transfer function of the continuous system as follows.

$$\frac{29.9(s+314)(s+2.90e4)(s+503)(s^\wedge 2+9.49e9)}{s(s+8.71e4)(s+7.04e4)(s^\wedge 2+5.84e4s+9.49e9)}$$

The characteristic of the digital controller shown in FIG. 8 is a characteristic where the transfer function of the continuous system is made discrete, and the parameters A, B, C and D of the output equation (Formula 3) and the state equation (Formula 4) are as follows.

$$A = \begin{bmatrix} 0.057856 & -0.06083 & 0.090038 & -0.00455 & 0.001945 \\ 0 & -0.22768 & -1.1431 & -0.01733 & 0.007409 \\ 0 & 0.517633 & 0.233851 & -0.01162 & 0.004966 \\ 0 & 0 & 0 & 0.163 & 0 \\ 0 & 0 & 0 & 0.012179 & 1 \end{bmatrix}$$

$$B = \begin{bmatrix} 42.25173 \\ 160.924 \\ 107.857 \\ 6312.912 \\ 66.11153 \end{bmatrix}$$

$$C = [\,-0.11394 \quad -0.01431 \quad 0.021183 \quad -0.00107 \quad 0.000458\,]$$

$$D = [9.940442]$$

Here the operation period Ts is 18.18 ($\mu$s).

Simulation was performed with MATLAB/SIMULINK, which are software manufactured by The MathWorks Inc. MATLAB/SIMULINK are software which performs time response simulation by graphically creating block diagrams. To simulate the analog controller and the conventional digital controller, blocks prepared with these software are used, which makes simulation easy.

Figure 10:
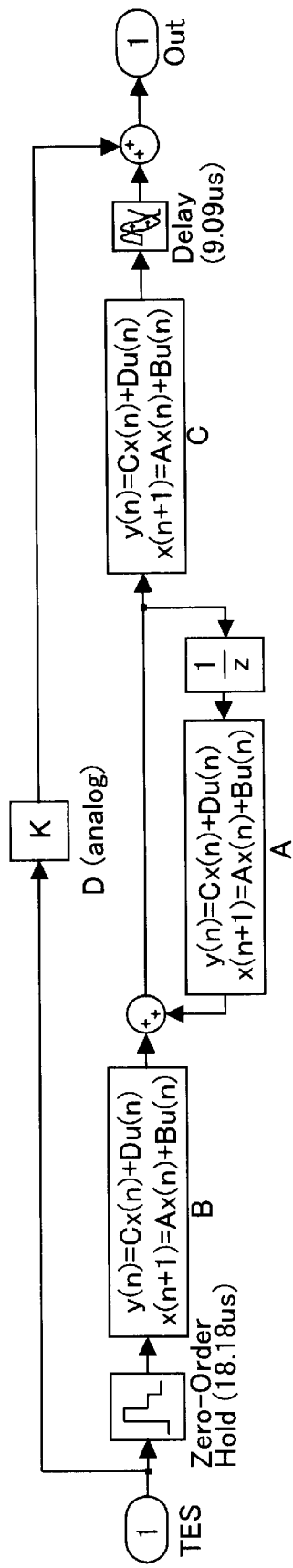
FIG. 10 is a diagram depicting a design example of the digital servo controller of the Example 1 of the present invention.

FIG. 10 shows a block diagram for implementing the digital controller according to the first embodiment by MATLAB/SIMULINK. In FIG. 10, A, B, C and D are the above mentioned constant matrixes, Zero-Order Hold is a block for holding the values of signals until the next period referring to the TES signal at each 18.18 $\mu$s operation period, Delay is a block for delaying the input signal for a predetermined time (9.09 $\mu$s in this case), and 1/z block is a discrete time operator. Based on this block diagram, the state equation is calculated using the matrix A and matrix B, digital observation signal ud[k] and internal variable x[k], and the first term of the output equation is calculated by multiplying the result x[k+1] thereof by the matrix C. The direct term is implemented by the analog amplification device which multiplies the analog observation signal u(t) by D=9.940442.

Figure 9:
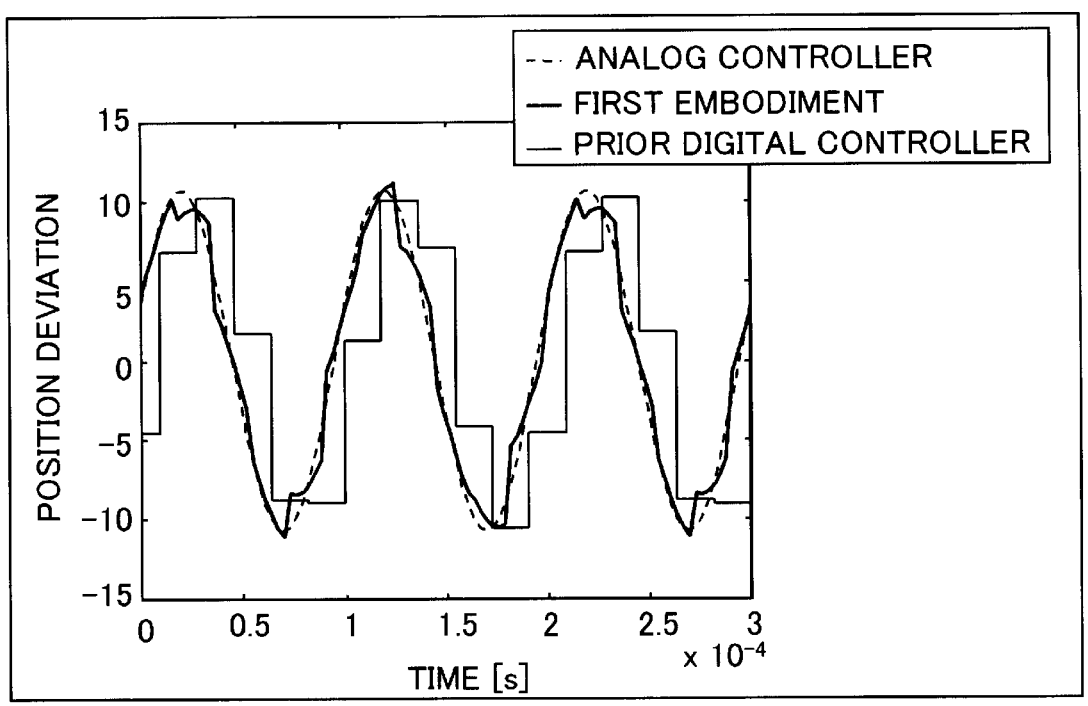
FIG. 9 is a diagram depicting the simulation result of the control signal of the Example 1 of the present invention.

FIG. 9 shows (1) the control signal in the case of the analog controller, (2) the control signal in the case of the first embodiment, and (3) the control signal in the case of a conventional digital controller when the sine wave which frequency is 10 [kHz] and amplitude is 1 is applied as the analog observation signal. In the simulation, the operation time delay of the DSP of the conventional digital controller is 3 [$\mu$s].

As FIG. 9 shows, in the control signal by the conventional digital controller, τ+Ts/2=3+18.18/2=12.09 [$\mu$s] of the delay time on average is generated, compared with the control signal by the analog controller. If the observation signal is 10 [kHz], which is a relatively high frequency, as seen in this case, it is clear that the influence of the delay time of the digital controller increases. The control signal of the first embodiment, on the other hand, roughly overlaps with the control signal of the analog controller, where the delay time is "0".

In the case of this example, there is only one observation signal and one control signal, so the circuits to be added to the conventional digital controller are only one analog amplification circuit and one analog addition circuit, where cost slightly increases, in terms of a general configuration.

The delay time of the controller appears as the delay of phase in the transfer characteristic. If there is a 12.09 [$\mu$s] delay time, as seen in the conventional digital controller of this example, the phase characteristic of the transfer characteristic has about a 4.4 [deg] delay when the frequency 1 [kHz], and about a 44 [deg] delay when the frequency is 10 [kHz], and because of this delay, the performance of the control system deteriorates. Therefore by applying the first embodiment, the performance of the control system can be increased at little cost.

Example 2

As an example of the second embodiment, a digital controller, which has the transfer characteristic shown in FIG. 8, was implemented by the above mentioned method of the second embodiment, and was executed by simulation using MATLAB/SIMULINK, just like the Example 1, which will be described below. The parameters A through D of the output equation (Formula 5) and the state equation (Formula 6) are the same as those of the Example 1. The operation period Ts is 18.18 [$\mu$s], and the state equation and the first term of the output equation are calculated at this period. The direct term is calculated at the period Ts/5=3.636 [$\mu$s]. In this case, the timing to update the first term C·x[k+1] of the output equation is Ts/2+Ts/(2×5)=10.908 [$\mu$s] after reading the observation signal y[k,1], which is the same timing as the update of D·ud[k,4].

Figure 11:
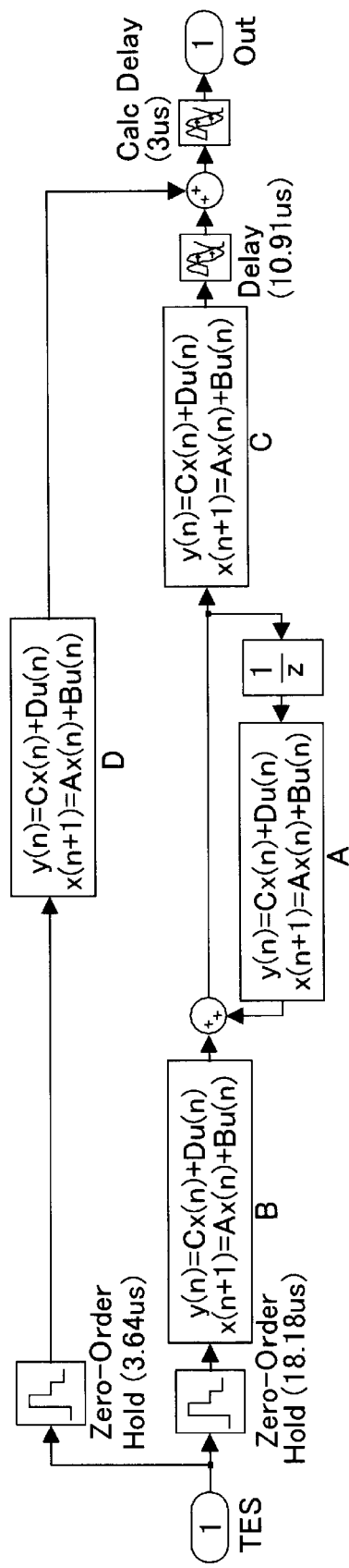
FIG. 11 is a diagram depicting a design example of the digital servo controller of the Example 2 of the present invention.

FIG. 11 shows a block diagram in MATLAB/SIMULINK of the second embodiment. In FIG. 11, A, B, C and D are the above mentioned constant matrixes, Zero-Order Hold (18.18 $\mu$s) is a block for holding the values of the signals until the next period referring to the TES signal at each 18.18 $\mu$s operation period, Zero-Order Hold (3.64 $\mu$s) is a block for holding the values of the signals until the next period referring to the TES signal at each 3.636 $\mu$s, Delay is a block for delaying the input signal for a predetermined time (10.908 $\mu$s in this case), and the 1/z block is a discrete time operator.

Figure 12:
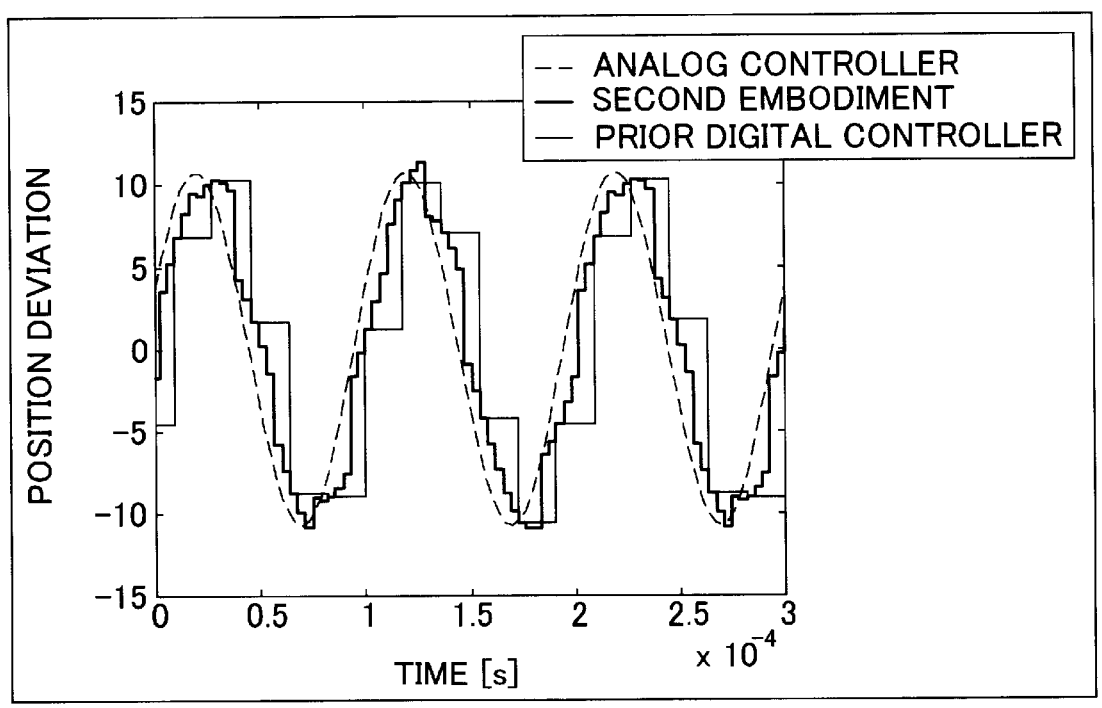
FIG. 12 is a diagram depicting the simulation result of the control signal of the Example 2 of the present invention.

FIG. 12 shows (1) the control signal in the case of the analog controller, (2) the control signal in the case of the second embodiment, and (3) the control signal in the case of a conventional digital controller, when the sine wave which frequency is at 10 [kHz] and amplitude is 1, is applied as the analog observation signal, just like he Example 1. In the simulation, the operation time delay of DSP is 3 [$\mu$s].

As FIG. 12 shows, in the control signal by the conventional digital controller, a 12.09 [$\mu$s] delay time is generated, just like the Example 1. In the control signal of the second embodiment, on the other hand, the delay time is τ+Ts/(2N)= 3+18.18/10=4.818 [$\mu$s], which is about a 60% decrease.

In the case of the Example 2, there is one observation signal and one control signal, and the operation period of the direct term is 5 times the basic operation period, so extra operations, that is multiplication ×4 and addition ×4, are required per cycle compared with a conventional digital controller. The number of times of operation in the conventional digital controller is multiplication ×22 and addition ×15 times, so in the present embodiment, multiplication ×26 and addition ×19 times are required.

In order to achieve the delay time 4.818 [$\mu$s] of the present embodiment using the conventional digital controller, all the operations must be completed with Ts/5=3.636 [$\mu$s], but in this case, operations must be executed during Ts=18.18 [$\mu$s] at multiplication ×110 and addition ×75 times, which is about 4 times the operation amount compared with the present invention.

Thus by applying the second embodiment, the delay time can be dramatically decreased by slightly increasing the calculation amount, and as a result, the control performance can be improved.

[Third Embodiment]

Figure 13:
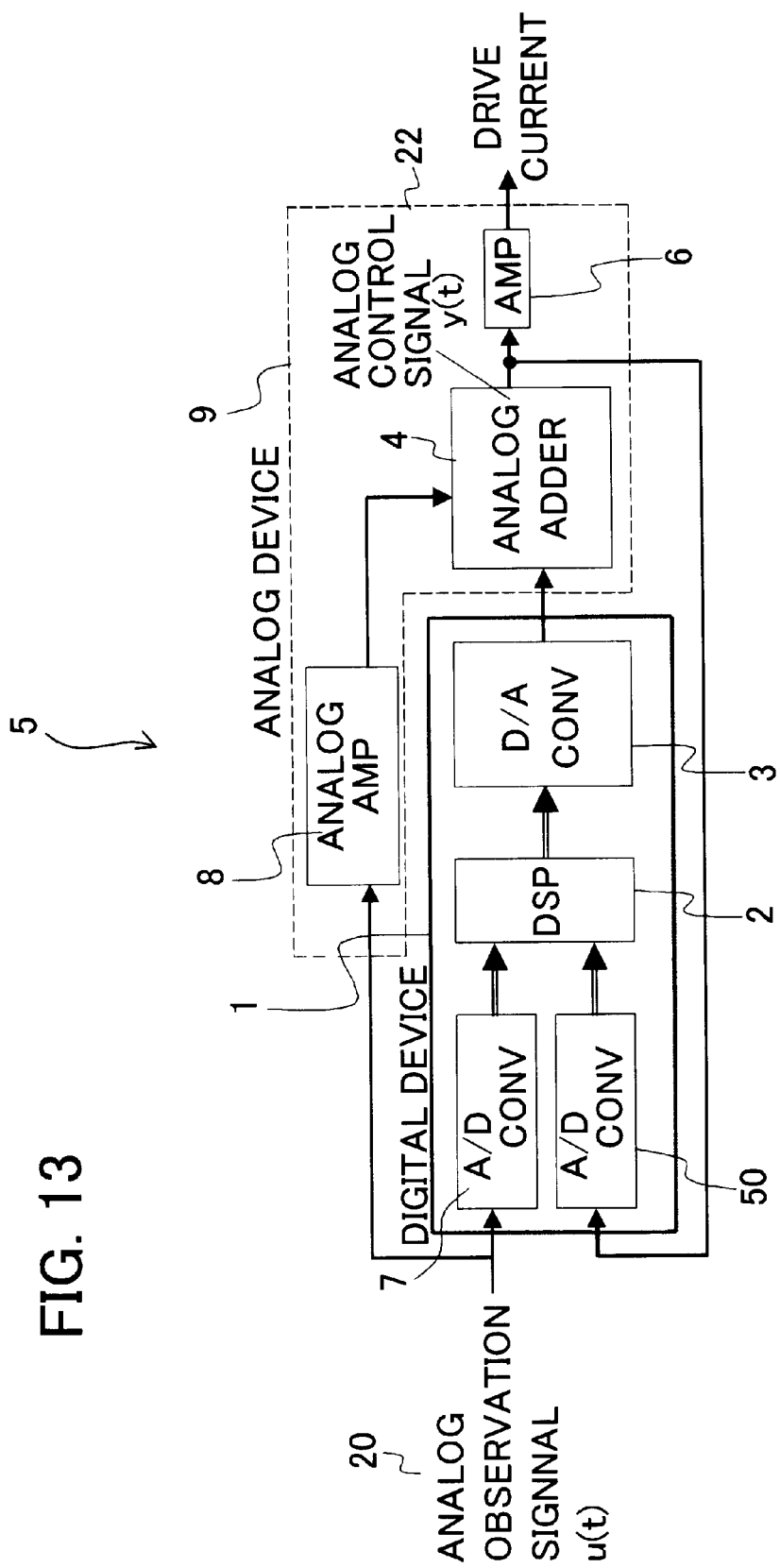
FIG. 13 is a block diagram depicting the digital servo controller according to the third embodiment of the present invention.
Figure 14:
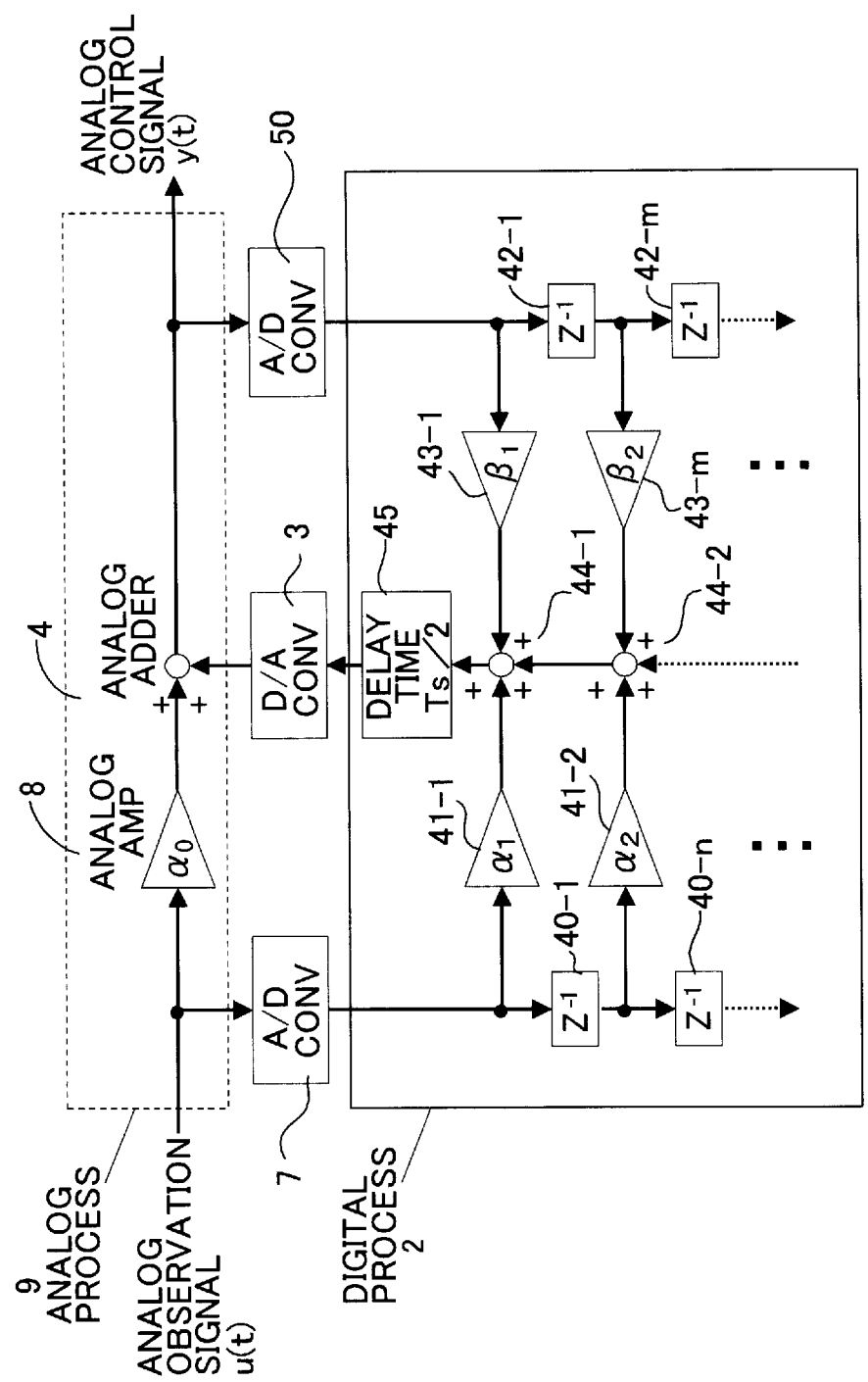
FIG. 14 is a block diagram depicting the processing in DSP according to the third embodiment in FIG. 13.

FIG. 13 is a diagram depicting the configuration of the digital controller according to the third embodiment of the present invention, and FIG. 14 is a block diagram depicting the processing of the DSP thereof.

In FIG. 13, the same composing elements as FIG. 2 are denoted by the same symbols. In other words, the controller (digital servo controller) 5 is comprised of the digital device 1 and the analog device 9. The digital device 1 is comprised of an A/D converter 7, which converts the analog observation signal 20, such as the position information and acceleration information of the head, into the digital signal, a DSP (Digital Signal Processor) 2, which performs operation according to the program which has been set in advance, and a D/A converter 3, which converts the digital control signal for deciding current to drive the head of the DSP 2, into the analog signal.

The analog device 9 is comprised of an analog amplification circuit 8 which analog-amplifies the analog observation signal 20, and an analog addition circuit 4 which adds the amplified analog signal and the analog signal from the digital device 1. The amplifier 6 flows a current to the actuator 105 according to the voltage of the analog control signal 22 from the analog addition circuit 4.

The controller 5, comprised of the analog device 9 and the digital device 1, operates the analog control signal 22 using the transfer equation (3), similar to that mentioned above. In other words, the equation based on the transfer function is as follows.

$$\frac{y(z)}{u(z)} = \frac{\alpha_0 \cdot z^\wedge n + \alpha_1 \cdot z^\wedge(n-1) + \cdots + \alpha_{n-2} \cdot z^\wedge 1 + \alpha_{n-1}}{z^\wedge m + \beta_1 \cdot z^\wedge(m-1) + \ldots + \beta_{m-2} \cdot z^\wedge 1 + \beta_{m-1}} \quad (3)$$

(where y(z) is a control signal to be output to the amplifier 6, u(z) is an observation signal to be input from the A/D converter 7, $\alpha i$ and $\beta i$ are constants, n and m are arbitrary integers, and z is a discrete time operator.)

In the Formula (3), only the term $\alpha_0$ is implemented by the analog amplification circuit 8, and the operations of other terms are performed by digital processing by the DSP 2. By outputting this digital processing result earlier for Ts/2 compared with the conventional method, and by adding the results of the term of $\alpha_0$ and the other terms by digital processing by the analog circuit 4, the delay time τ+Ts/2, which occurs in a conventional digital controller, can be 0.

Operations of the term $\alpha_0$ and the other terms will now be described separately.

Term of $\alpha_0$: In the conventional method, the term $\alpha_0$ is processed during operation by DSP, so the delay time τ+Ts/2 is generated. In this embodiment, this processing is implemented by the analog circuit 8. Therefore no delay time is generated.

Other terms: The terms other than $\alpha_0$ are calculated based on the observation signal in the past and the control signal in the past, as shown in FIG. 14. In other words, the processing block of the DSP 2 has n number of delay elements 40-1 through 40-n, which are connected in serial for delaying the observation signal from the A/D converter 7, and the multiplication elements 41-1 through 41-n for multiplying the input of each delay element 40-1 through 40-n by the constants al through an. This means that the terms other than $\alpha_0$ on the upper level of the Formula (3) are calculated.

The processing of the DSP 2 also has m number of delay elements 42-1 through 42-n which are connected in serial for delaying the control signal from the A/D converter 50, and the multiplication elements 43-1 through 43-n for multiplying the input of each delay element 42-1 through 42-n by the constants $\beta 1$ through $\beta n$. This means that each term of the lower level of the Formula (3) is calculated. The addition elements 44-1 through 44-n add both the multiplication results. The delay element 45 delays the addition result for Ts/2, and outputs it to the D/A converter 3.

For this, both the observation signal and the control signal in the past are used, and the calculation result of these terms can be output earlier for Ts–[operation time] at the maximum. Therefore the delay time can be "0" by outputting the calculation result earlier for Ts/2 compared with a conventional method.

Since the delay time of the term $\alpha_0$ and the other terms is 0, the control output when both of these are added by the analog circuit 4 can also be 0. This method does not require an integration circuit and differentiation circuit, unlike an analog controller, and requires only an amplification circuit and addition circuit, so cost is low, and also the major parts of the controller are implemented by the digital controller, so flexibility is not lost.

Figure 15:
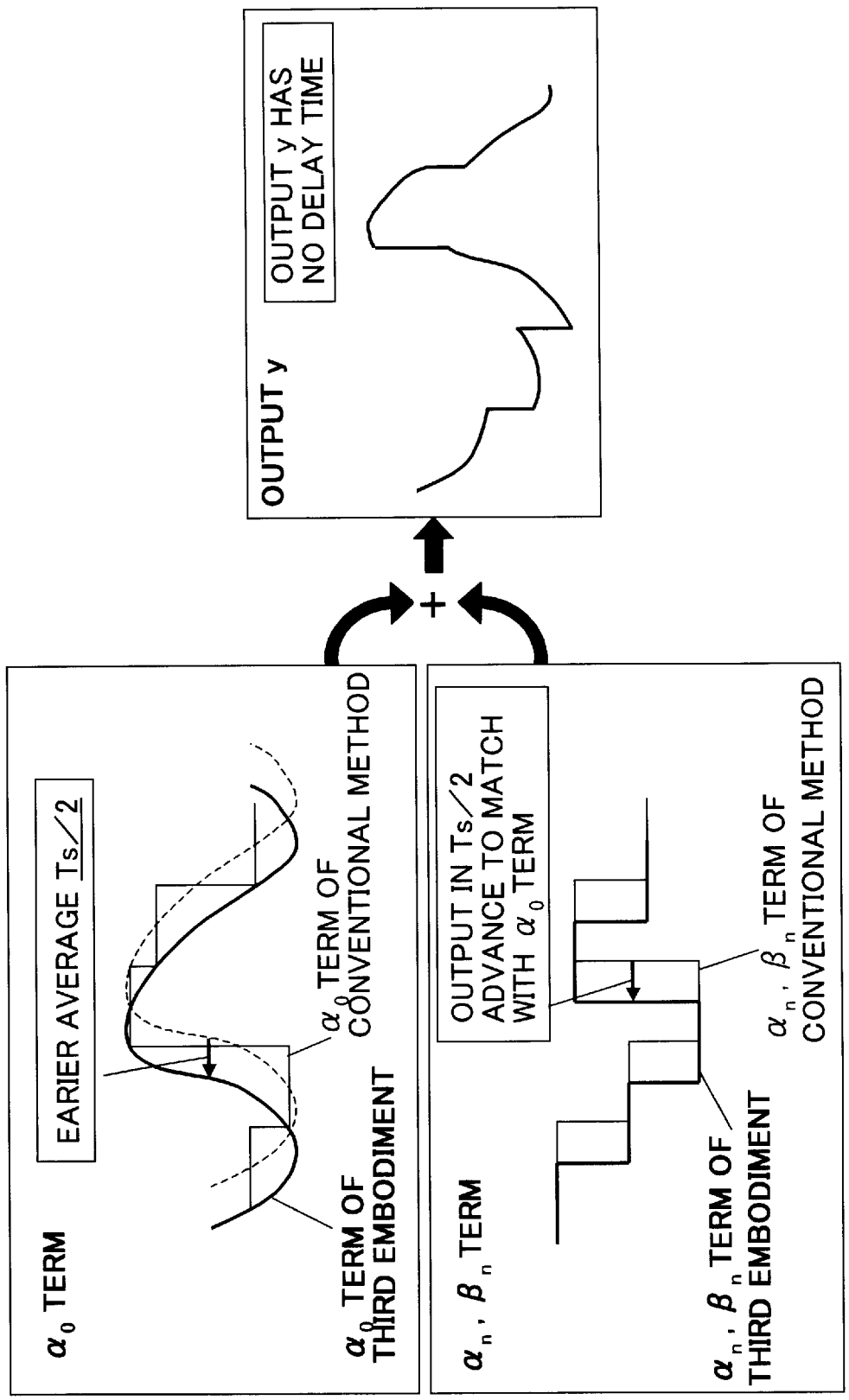
FIG. 15 is a diagram depicting the operation in the configuration in FIG. 13.

FIG. 15 is a diagram depicting the signal waveform of the term $\alpha_0$, and the signal waveform of the terms $\alpha_n$ and $\beta_n$ ($n \geq 1$) compared with the case of a conventional digital controller.

For the signal waveform of the term $\alpha_0$ (upper left in FIG. 15), a delay time is not generated in the present embodiment since an analog circuit is used, and the signal is output earlier for Ts/2 on average compared with a conventional device.

For the signal waveform of the terms $\alpha_n$ and $\beta_n$ (lower left in FIG. 15), the time from observing the observation signal u at a certain sampling point until reflecting the calculation result of the term $\alpha_n$ and $\beta_n$ on output is Ts in a conventional method. Whereas according to the present embodiment, the term $\alpha_0$ does not have a delay time, and output is earlier for Ts/2 compared with a conventional method, so corresponding to this, the calculation result of the term $\alpha_n$ and $\beta_n$ is output earlier for Ts/2. In other words, the time from observing the observation signal u until the calculation result is reflected on output is Ts/2.

Since the signal of the term $\alpha_0$ and the signal of the term $\alpha_n$ and $\beta_n$ are both output earlier for Ts/2 compared with a conventional method, the control signal y, which is a value when these are added, is also output earlier for Ts/2 compared with a conventional method, where a delay time is not generated on output.

Figure 30:
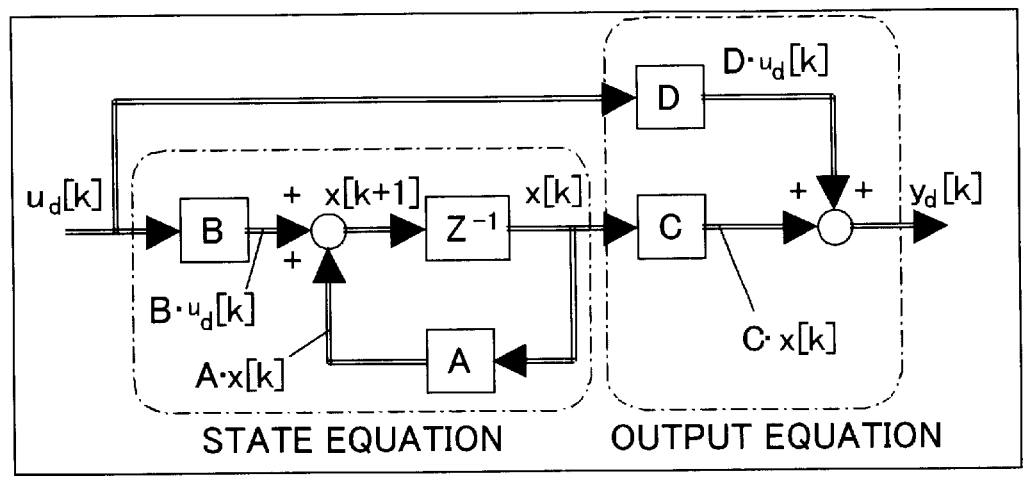
FIG. 30 is a block diagram depicting the processing of DSP of a conventional digital servo controller.
Figure 31:
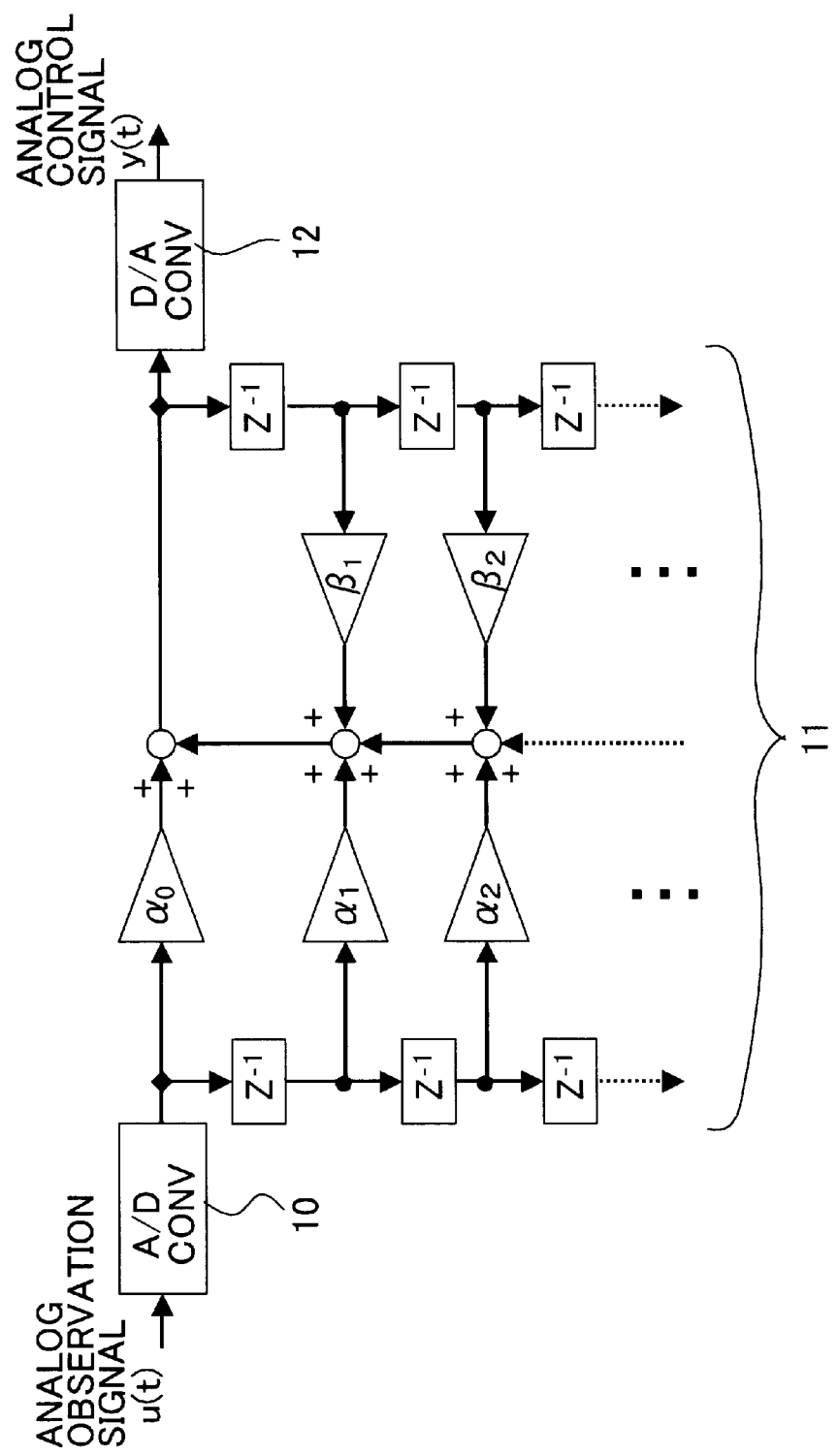
FIG. 31 is a block diagram depicting another processing of DSP of a conventional digital servo controller.
Figure 32:
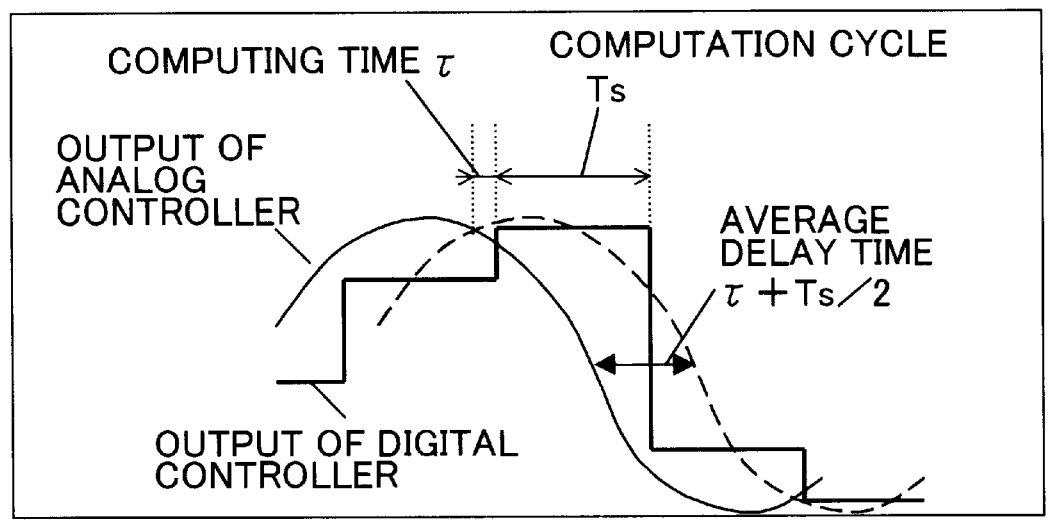
FIG. 32 is a diagram depicting the delay of the control signal of a conventional digital servo controller.

Such a transfer function representation will be described. Generally there are two types of equation representation methods to implement the controller for control by DSP, that is, a method of using a state equation and a method of using a transfer function. The state equation, shown in FIG. 30, for example, has a merit of making implementation of a multi-input multi-output system possible. The transfer function representation, on the other hand, has a huge merit, that is, the number of times of operation is less than the state equation.

For example, when the number of times of operation is compared between the transfer function and state equation in the case of 1 input 1 output, if a 4th order controller is used, the state equation requires 25 times of multiplication and 20 times of addition, whereas the transfer function requires only 9 times of multiplication and 8 times of addition (that is, based on the assumption that the matrixes of the state equation are all numerals other than 0). This tendency increases as the order of the controller increases, so it is advantageous to describe an equation in transfer function format if a controller with a complicated characteristic is implemented.

It is most advantageous in terms of cost if the number of times of operation is Low, because the same performance can be exhibited even if an inexpensive DSP with a low processing capability is Used.

[Fourth Embodiment]

Figure 16:
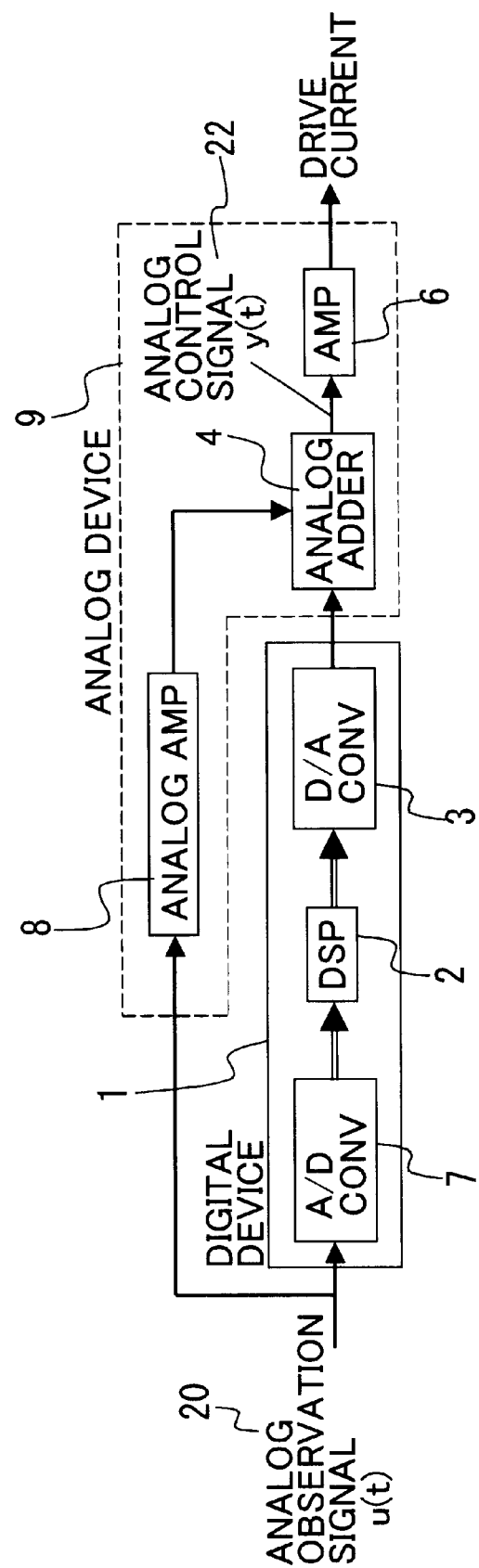
FIG. 16 is a block diagram depicting the digital servo controller according to the fourth embodiment of the present invention.
Figure 17:
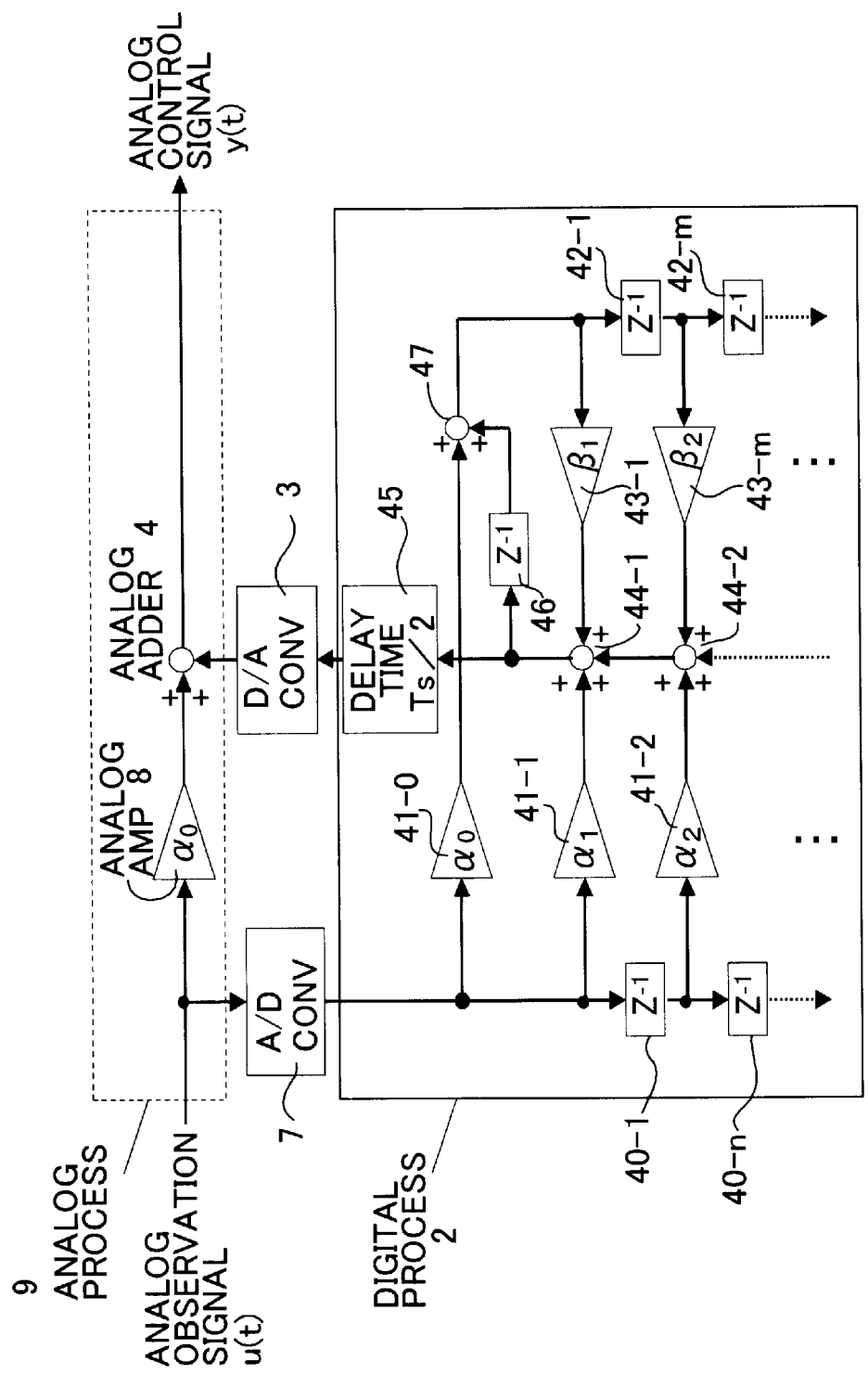
FIG. 17 is a block diagram depicting the processing of DSP in FIG. 16.

FIG. 16 is a diagram depicting the configuration of the digital controller according to the fourth embodiment of the present invention, and FIG. 17 is a block diagram depicting the processing of the DSP thereof.

In FIG. 16, the same composing elements as FIG. 13 are denoted by the same symbols. In other words, the controller (digital servo controller) 5 is comprised of the digital device 1 and the analog device 9. The digital device 1 is comprised of an A/D converter 7, which converts the analog observation signal 20, such as the position information and acceleration information of the head, into the digital signal, a DSP (Digital Signal Processor) 2, which performs operation according to the program which has been set in advance, and a D/A converter 3, which converts the digital control signal, for deciding current to drive the head of the DSP 2, into the analog signal.

The analog device 9 is comprised of an analog amplification circuit 8 which analog-amplifies the analog observation signal 20, and an analog addition circuit 4 which adds the amplified analog signal and the analog signal of the digital device 1. The amplifier 6 flows a current to the actuator 105 according to the voltage of the analog control signal 22 from the analog addition circuit 4.

The controller 5, comprised of the analog device 9 and the digital device 1, operates the analog control signal 22 using the transfer equation (3) similar to that mentioned above. As FIG. 17 shows, according to the present embodiment, only the term $\alpha_0$ in Formula (3) is implemented by the analog circuit 8, the operation result of the other terms is output earlier for Ts/2 compared with a conventional method, and the result of both the operations of $\alpha_0$ and other terms are added by the analog circuit, so the delay time $\tau$+Ts/2, which occurs in a conventional digital controller, can be 0. The mechanism for the delay time to be 0 is the same as the third embodiment.

In other words, the processing block of the DSP 2 has n number of delay elements 40-1 through 40-n which are connected in serial for delaying the observation signal from the A/D converter 7, and the multiplication elements 41-1 through 41-n for multiplying the input of each delay element 40-1 through 40-n by the constants al through an. This means that the terms other than $\alpha 0$ on the upper level of the Formula (3) are calculated.

The processing block of the DSP 2 also has m number of delay elements 42-1 through 42-n which are connected in serial for delaying the control signal, and the multiplication elements 43-1 through 43-n for multiplying the input of each delay element 42-1 through 42-n by the constants $\beta 1$ through $\beta n$ This means that each term of the lower level of the Formula (3) is calculated. The addition elements 44-1 through 44-n add both the multiplication results. The delay element 45 delays the addition result for Ts/2, and outputs it to the D/A converter 3.

The difference is that the value of the control signal y(z) to be used for the operation of the Formula (3) is not obtained by the A/D converter 50 as in FIG. 14, but is determined from the observation signal u(t) by calculation. In other words, the observation signal u is multiplied by α0 by the multiplication element 41-0, the addition result delayed by the delay element 46 is added by the addition element 47, and the control signal is obtained. This is input to the delay element 42-1 and the multiplication element 43-1.

This method makes it unnecessary to add a new A/D converter 50 to a conventional digital device. And just like FIG. 15, the observation signal and control signal in the past are used, and the calculation result of these terms can be output earlier for Ts−[operation time] at the maximum. Therefore by outputting the calculation result earlier for Ts/2 compared with a conventional method, the delay time can be "0".

The difference, however, is not obtaining the value of the control signal y(t) to be used for the operation of the Formula (1) by the A/D converter, but determining the value of the control signal y(t) by calculating from the observation signal u(t). This method makes it unnecessary to add a new A/D converter to a conventional digital device.

[Fifth Embodiment]

Figure 18:
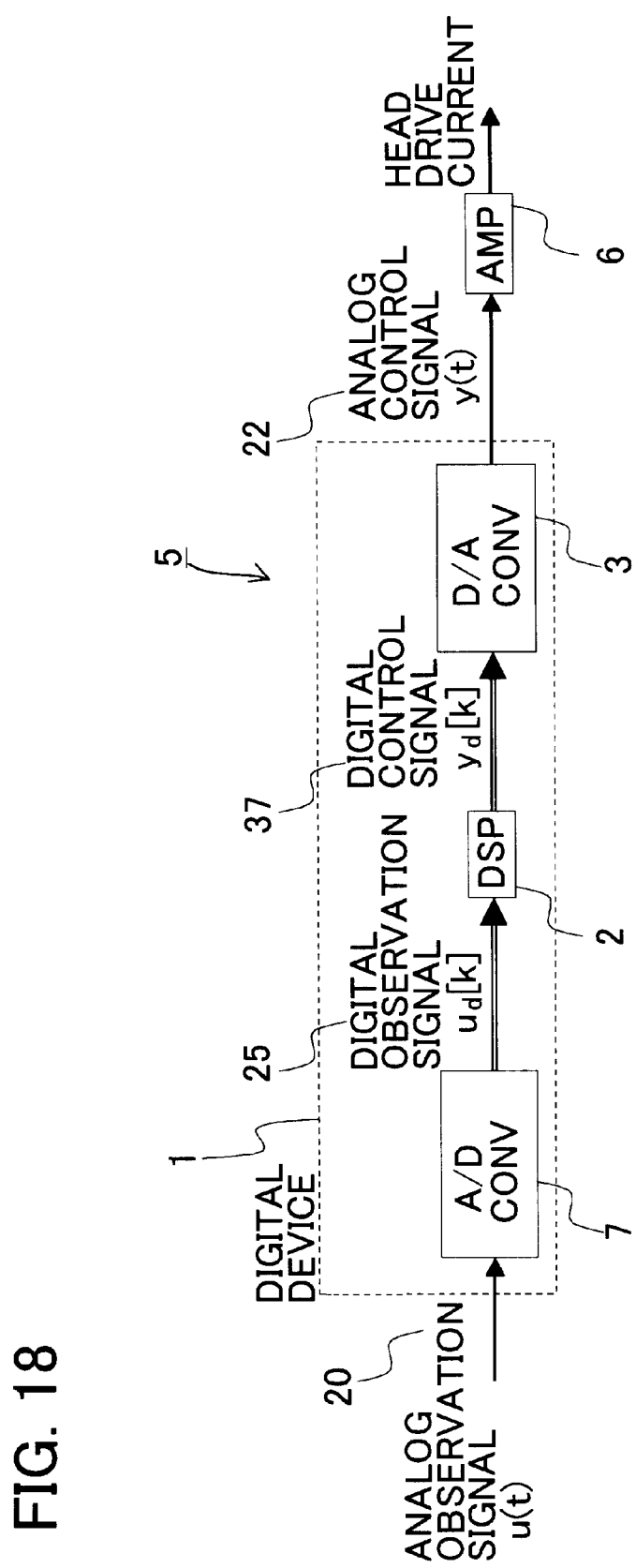
FIG. 18 is a block diagram depicting the digital servo controller according to the fifth embodiment of the present embodiment.
Figure 19:
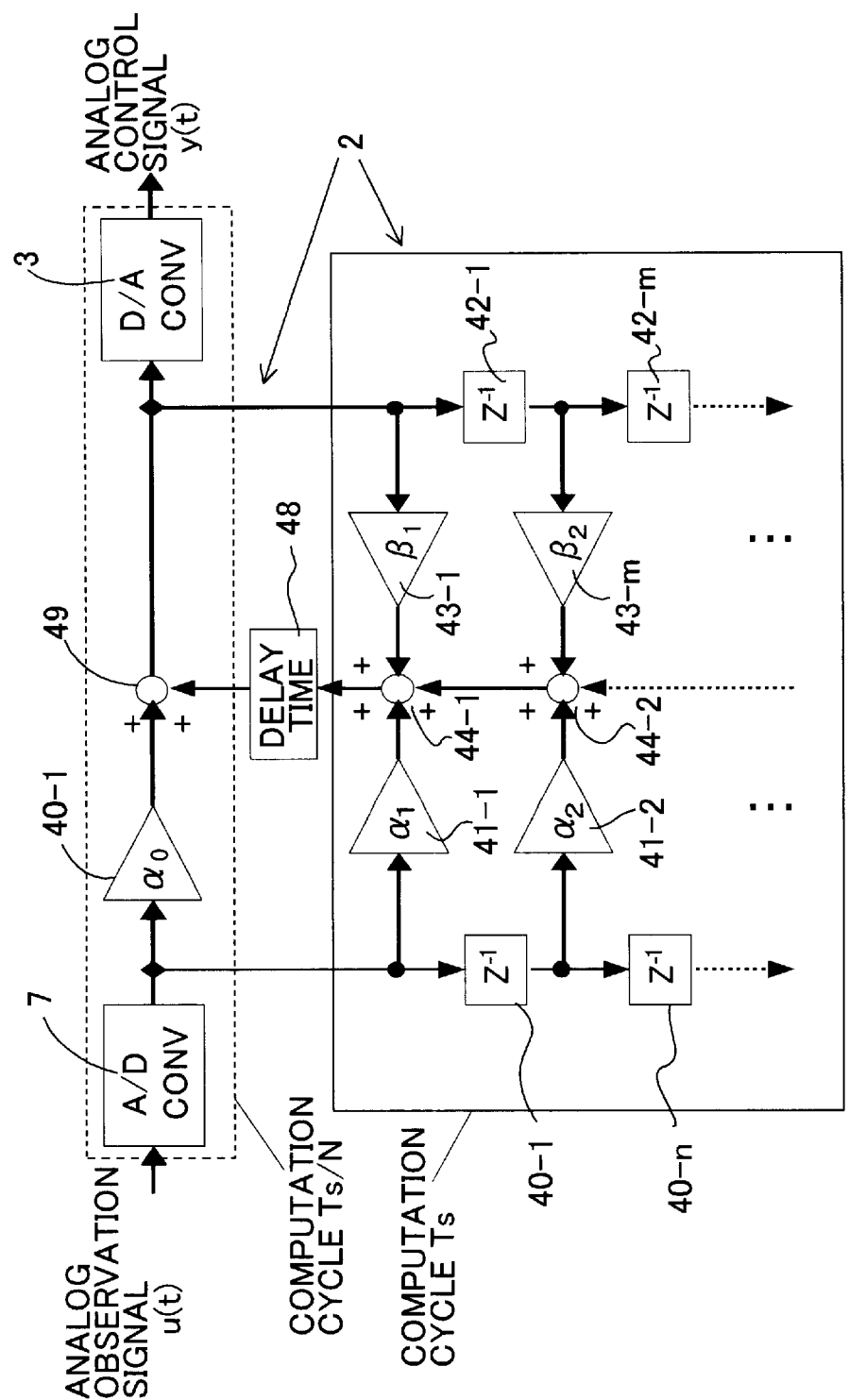
FIG. 19 is a block diagram depicting the processing of the DSP in FIG. 18.
Figure 20:
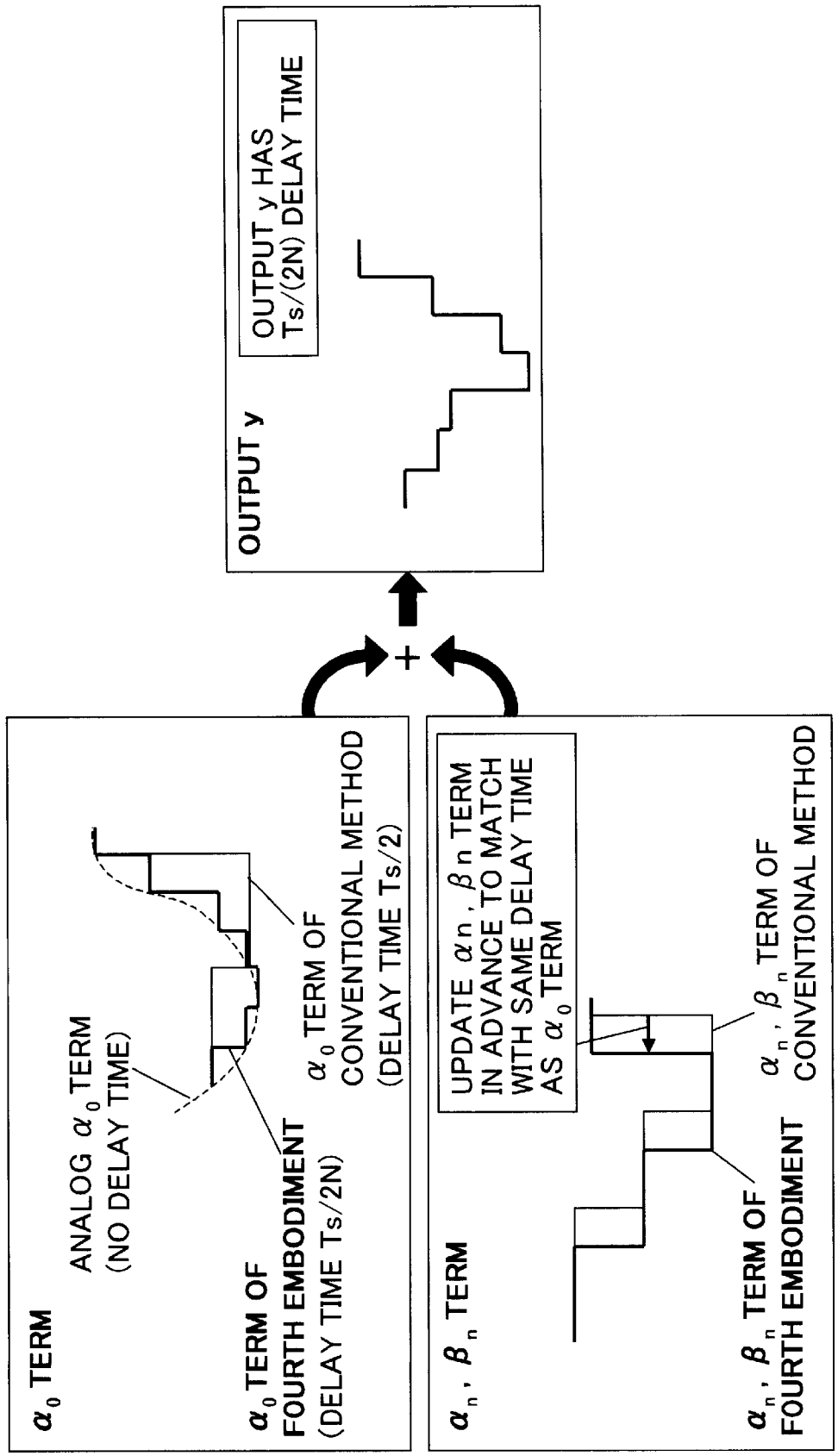
FIG. 20 is a diagram depicting the operation of the fifth embodiment in FIG. 18.
Figure 21:
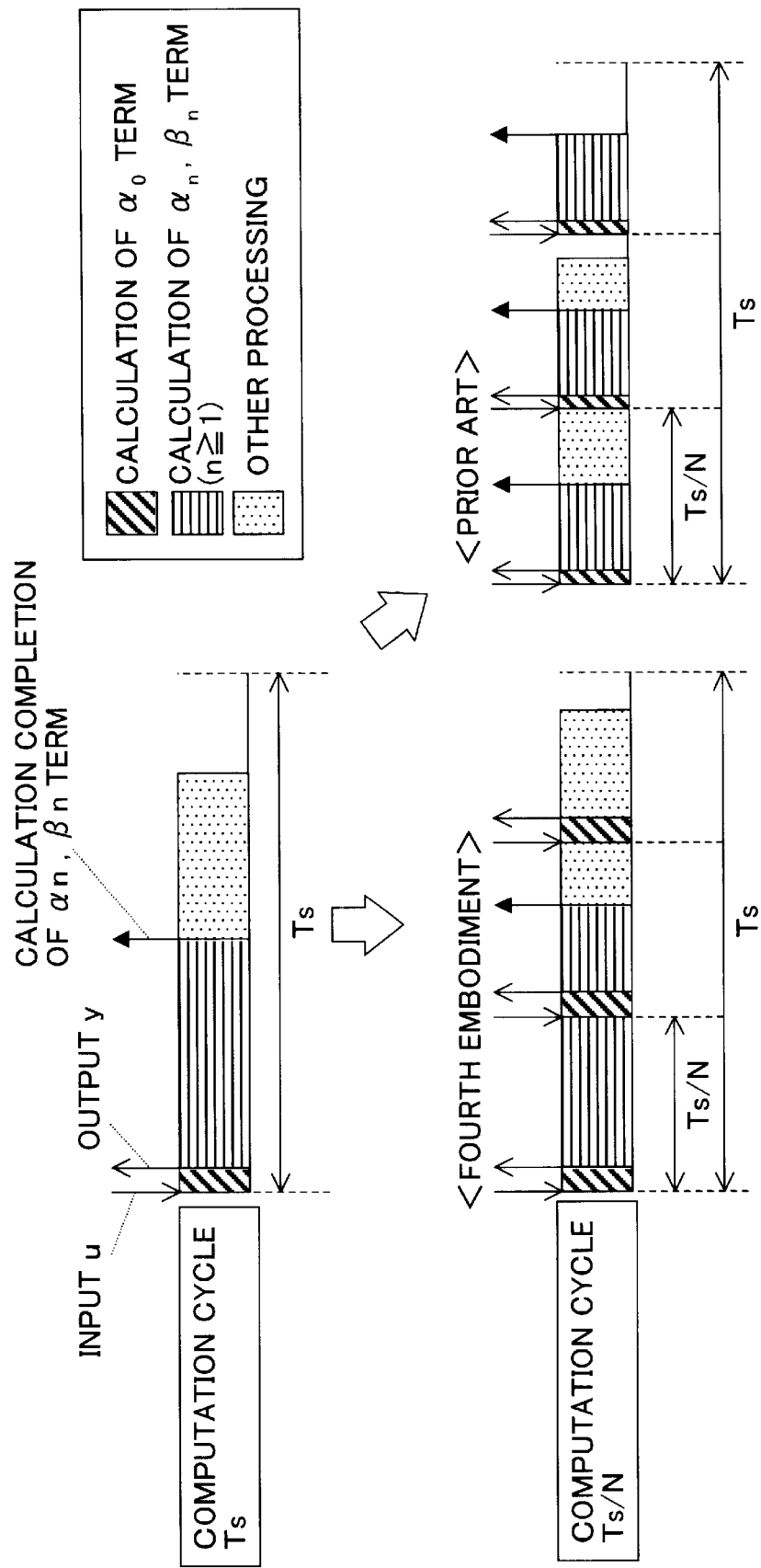
FIG. 21 is a diagram depicting the processing operation of the DSP in the configuration in FIG. 18.

FIG. 18 is a block diagram depicting the servo controller according to the fifth embodiment of the present invention, FIG. 19 is a block diagram depicting the processing of the DSP thereof, FIG. 20 is a diagram depicting the arithmetic processing thereof, and FIG. 21 is a diagram depicting the operation thereof.

As FIG. 18 shows, the controller 5 is comprised only of the digital device 1. In other words, the digital device 1 is comprised of an A/D converter 7, which converts the analog observation signal 20, such as the position information and acceleration information of the head, into the digital signal 25, a DSP (Digital Signal Processor) 2, which performs operation according to the program which has been set in advance, and a D/A converter 3, which converts the digital control signal for deciding current to drive the head of the DSP 2 into the analog signal. The controller 5 comprised of the digital device 1 operates the digital control signal 37 by the equation (3) of the transfer function, similar to that mentioned above.

As FIG. 19 shows, the DSP 2 calculates only the term $\alpha_0$ of the Formula (3) at the period Ts/N, which is 1/N of the normal period Ts, and updates the operation result of the other terms synchronizing with the delay time of the term $\alpha_0$. By this, the delay time τ+Ts/2, which occurs in a conventional digital controller, can be τ+Ts/(2N).

Operations of the term $\alpha_0$ and the other terms will now be described separately.

Term of $\alpha_0$: In the conventional method, the delay time τ+Ts/2 was generated, but the delay time can be τ+Ts/(2N) by multiplying the operation period by 1/N.

Other terms: The terms other than $\alpha_0$ are calculated based on the observation signal in the past and control signal in the past. In other words, the processing block of DSP 2 has n number of delay elements 40-1 through 40-n which are connected in serial for delaying the observation signal from the A/D converter 7, and the multiplication elements 41-1 through 41-n for multiplying the input of each delay element 40-1 through 40-n by the constants α1 through αn. This means that the terms other than α0 on the upper level of the Formula (3) are calculated. The processing block of the DSP 2 has also m number of delay elements 42-1 through 42-n which are connected in serial for delaying the control signal, and the multiplication elements 43-1 through 43-n for multiplying the input of each delay element 42-1 through 42-n by the constants β1 through βn. This means that each term on the lower level of the Formula (3) is calculated. The addition elements 44-1 through 44-n add both the multiplication results. The delay element 48 delays the addition result for the delay time of the term α0, and outputs it to the addition element 49.

The addition element 49 adds the term α0, which is the observation signal multiplied by α0 by the multiplication element 40-1, and the output of the delay element 48, and outputs the digital control signal yd[k] to the D/A converter 3. For this, the observation signal and the control signal in the past are used, and the calculation result of these terms can be output earlier for Ts−[operation time] at the maximum. Therefore the delay time can be τ+Ts/(2N) by updating the calculation result synchronizing with the delay time of the term $\alpha_0$.

Since the delay time of the term $\alpha_0$ and the other terms is τ+Ts/(2N), the control output, when both of these are added can also be τ+Ts/(2N).

FIG. 20 is a diagram depicting the signal waveform of the term $\alpha_0$ and the signal waveform of the term $\alpha_n$ and $\beta_n$ (n≧1) according to the fifth embodiment compared with the case of a conventional digital controller. For the signal waveform of the term $\alpha_0$ (upper left in FIG. 20), the conventional waveform has delay time Ts/2, but the waveform of the present invention has delay time Ts/(2N).

For the signal waveform of the terms $\alpha_n$ and $\beta_n$ (lower left in FIG. 20), time from observing the observation signal u at a certain point of time until reflecting the calculation result of the term $\alpha_n$ and $\beta_n$ on output is Ts in a conventional method. Whereas according to the present embodiment, the calculation result is output earlier for Ts/2−Ts/(2N) corresponding to the delay time of the direct term, which is Ts/(2N). In other words, the time from observing u to reflecting the calculation result on output is Ts/2+Ts/(2N).

Since the signal of the term $\alpha_0$ and the signal of term $\alpha_n$ and $\beta_n$ are both output earlier for Ts/2−Ts/(2N) than a conventional method, the control signal y, which is a value when these are added, is also output earlier for Ts/2−Ts/(2N) than a conventional method, where the delay time of output is Ts/2N).

FIG. 21 is a conceptual diagram of the operation time of DSP in the fifth embodiment. When the operation period is Ts in a conventional method (top in FIG. 21), the observation signal u is read and is multiplied by $\alpha_0$ first, then the result of the term $\alpha_n$ and $\beta_n$ (n≧1), which has been calculated with the previous sample, is added there to generate the control signal y, and the control signal y is output (diagonal line section in FIG. 21). Then the terms $\alpha_n$ and $\beta_n$ are calculated (horizontal line section) and the other processing is performed in the remaining time (dotted section).

When the operation period is Ts/N in the conventional is method (lower right in FIG. 21), the same processing must be completed during time Ts/N, so compared with the case of period Ts, an expensive DSP with a faster operation speed is required.

In the case of the present embodiment (lower left in FIG. 21) however, N times of operation during Ts is required only for the diagonal line section, and for the horizontal line section, only one calculation is required during Ts. For the calculation for the term $\alpha_0$, one multiplication and one addition are required, so the operation amount increases very little compared with the conventional method with operation period Ts (top in FIG. 21). Therefore the servo controller can be implemented with a relatively inexpensive DSP which operation speed is slow, where the delay time can be the same as the conventional method with operation period Ts/N (lower right in FIG. 21).

Other Examples

Example 3

As an example of the third embodiment of the present invention, the transfer function in the following Formula (4) was implemented by the method of the third embodiment, and simulated, which will be described below.

$$\frac{u(z)}{u(z)} = \frac{1.4864 z^{\wedge} 2 - 1.7254 z + 0.61677}{z^{\wedge} 2 - 1.9120 z + 0.91579} \quad (4)$$

(Operation period: Ts=100 [μs])

Figure 22:
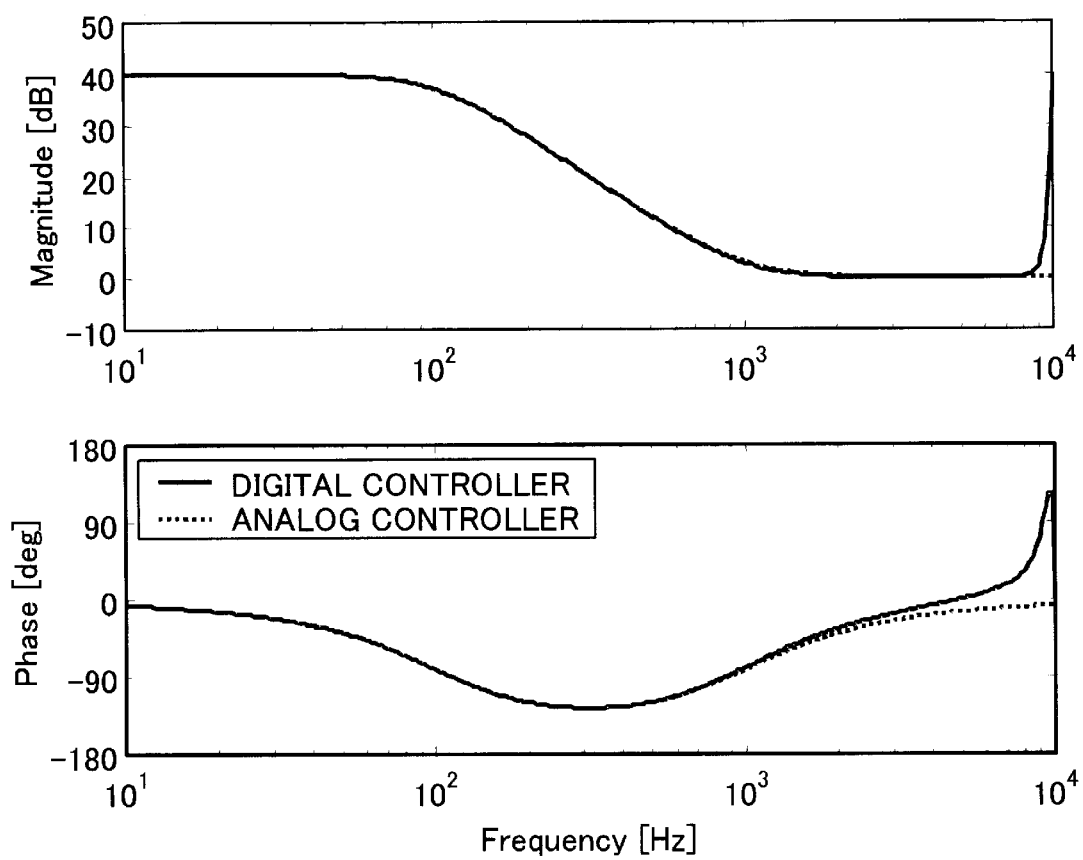
FIG. 22 is a transfer characteristic diagram of a controller according to another example of the present invention.

FIG. 22 is a frequency characteristic diagram of this transfer function.

This transfer function has a 2nd order phase delay element.

Low side break frequency: 100 [Hz]
Low side damping factor: 0.7
High side break frequency: 1000 [Hz]
High side damping factor: 0.7

Figure 25:
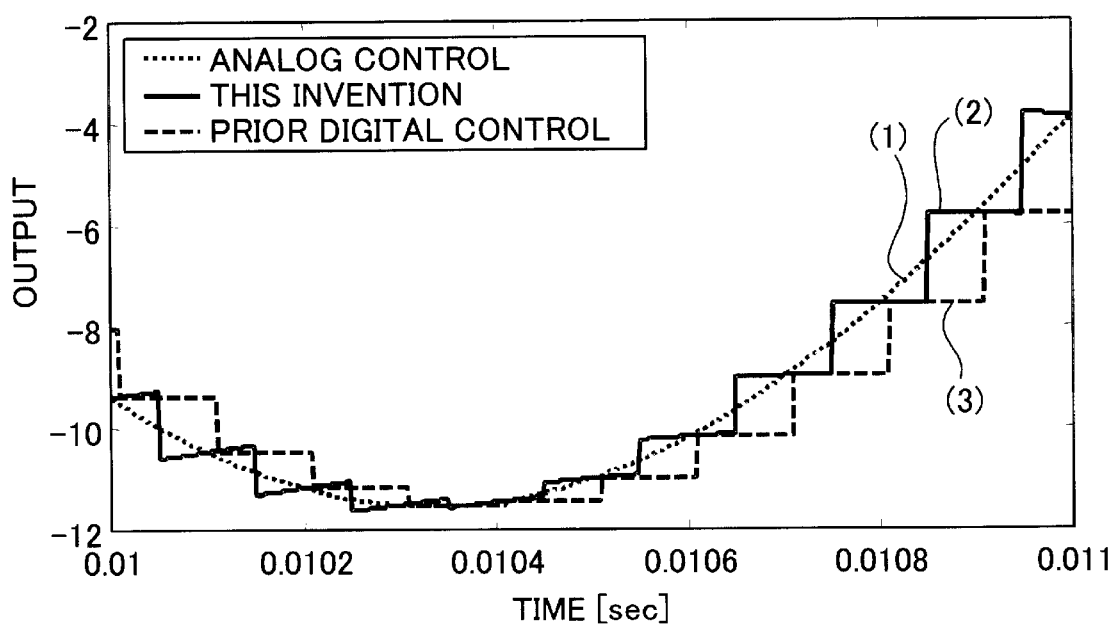
FIG. 25 is a diagram depicting the simulation result of the control signal according to Example 3 of the present invention.

For comparison, FIG. 25 shows the result when the controller having the same transfer characteristic was implemented by a conventional method, and shows the simulation result of the analog controller having the transfer characteristic indicated by the dotted line in FIG. 22. The Formula (5) shows the transfer function of the continuous system used for comparison.

$$\frac{y(s)}{u(s)} = \frac{s^{\wedge} 2 - 9061 s + 3925 e4}{s^{\wedge} 2 - 877.3 s + 3925 e2} \quad (5)$$

Simulation was performed with MATLAB/SIMULINK, which are software manufactured by The MathWorks, Inc. MATLAB/SIMULINK are software which performs time response simulation by graphically creating block diagrams. To simulate the analog controller and conventional digital controller, blocks prepared in the software are used, which makes simulation easy.

Figure 23:
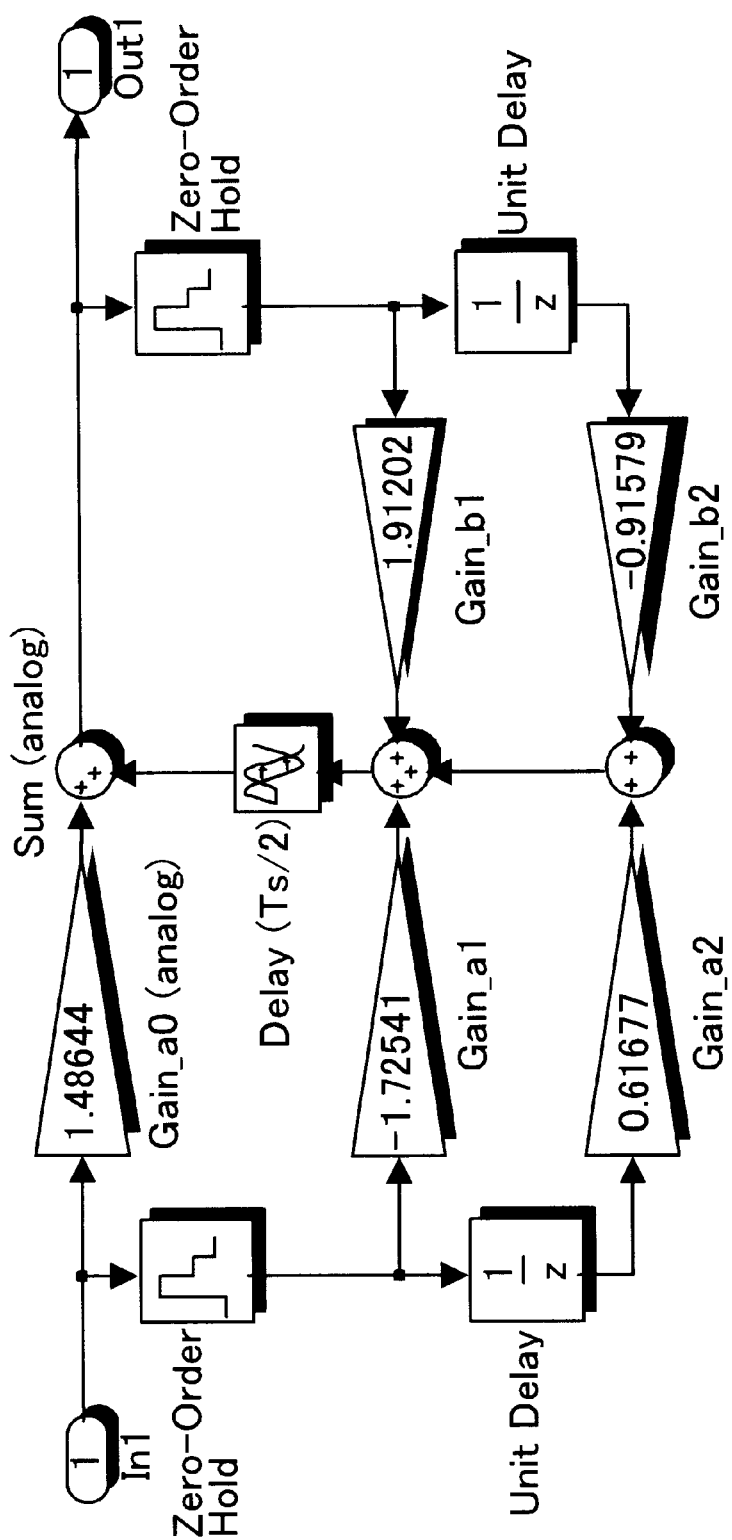
FIG. 23 is a diagram depicting a design example of the digital servo controller according to the Example 3 of the present invention.

FIG. 23 is a block diagram for implementing the controller according to the third embodiment by MATLAB/SIMULINK. In FIG. 23, "Gain_*" is a constant of the Formula (4), "Zero-Order Hold" is a block corresponding to an A/D converter for holding the value of the signal until the next period referring to the TES signal at each operation period and, "Delay" is a block for delaying the input signal for a predetermined time, and "Unit Delay" is a discrete time operator for delaying the signal for one operation period. In this block diagram, only the block of "Gain_a0" and the addition block next thereto are based on the assumption that analog circuits are used, and the other blocks are all based on the assumption that arithmetic processing is performed in DSP.

Figure 24:
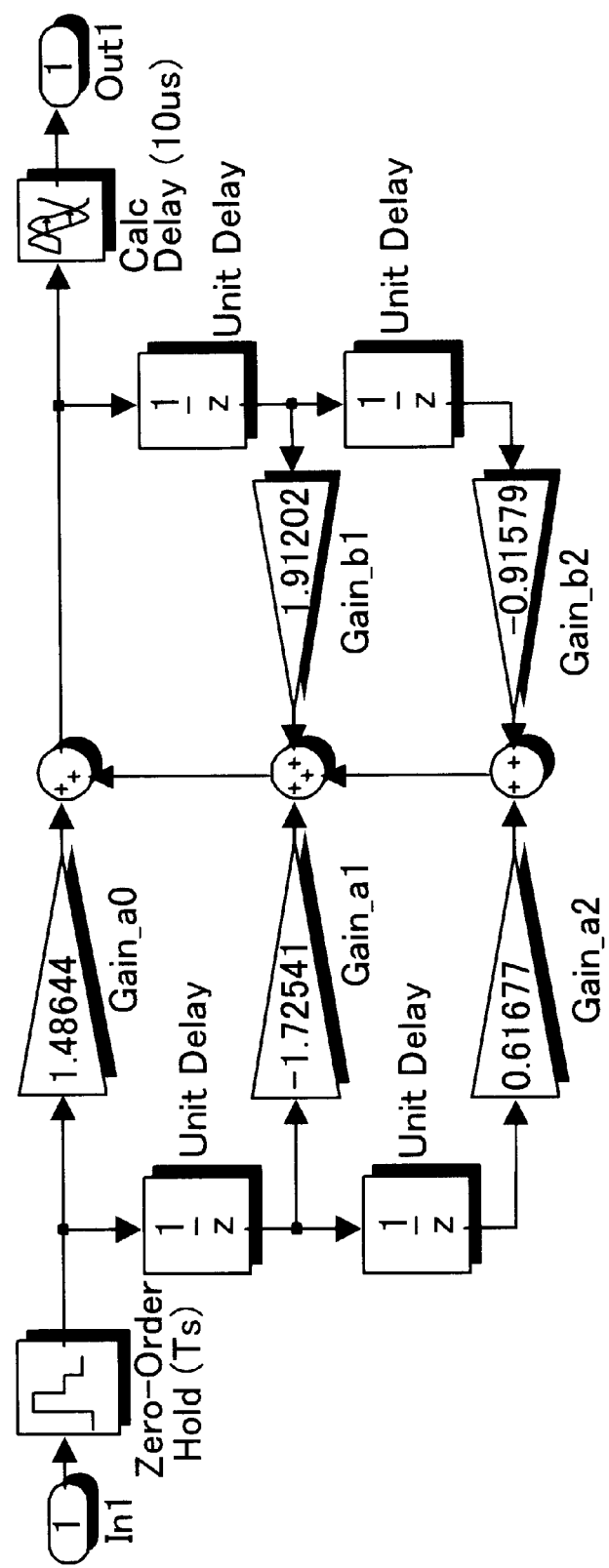
FIG. 24 is a diagram depicting a design example of the digital servo controller according to a comparison example of the present invention.

For comparison, FIG. 24 shows a block diagram of the conventional arithmetic processing. In the conventional processing, the observation signal obtained from the A/D converter is directly used only for the term $\alpha_0$, and for the terms $\alpha_1$, $\beta_1$, the observation signal and control signal obtained in previous operation period are used, and for the terms $\alpha_2$ and $\beta_2$, the observation signal and control signal obtained two operation periods before are used.

Whereas according to the third embodiment of the present invention, the term $\alpha_0$ is implemented by the analog circuit, and the observation signal obtained from the A/D converter is used directly for the operation of the term $\alpha_1$ and $\beta_1$ without passing through "Unit Delay".

Therefore the timing of the operation of the terms $\alpha_1$, $\alpha_2$, $\beta_1$ and $\beta_2$ are earlier than a conventional method for one operation period. And by delaying the output of the analog adder for ½ operation period in the "Delay (Ts/2)" block, the conventional delay time Ts/2 can be 0. If the operation can be completed within a ½ operation period, delay due to the operation time is not generated either.

FIG. 25 shows (1) the control signal in the case of the analog controller, (2) the control signal in the case of the present invention, and (3) the control signal, in the case of a conventional digital controller when the sine wave which frequency is 300 [Hz] and amplitude is "1", is applied as the analog observation signal. In the simulation, the operation time delay of the DSP of the conventional digital controller is 10 [μs]. The present invention is clearly closer to the response of the analog controller compared with the conventional method.

Example 4

Figure 26:
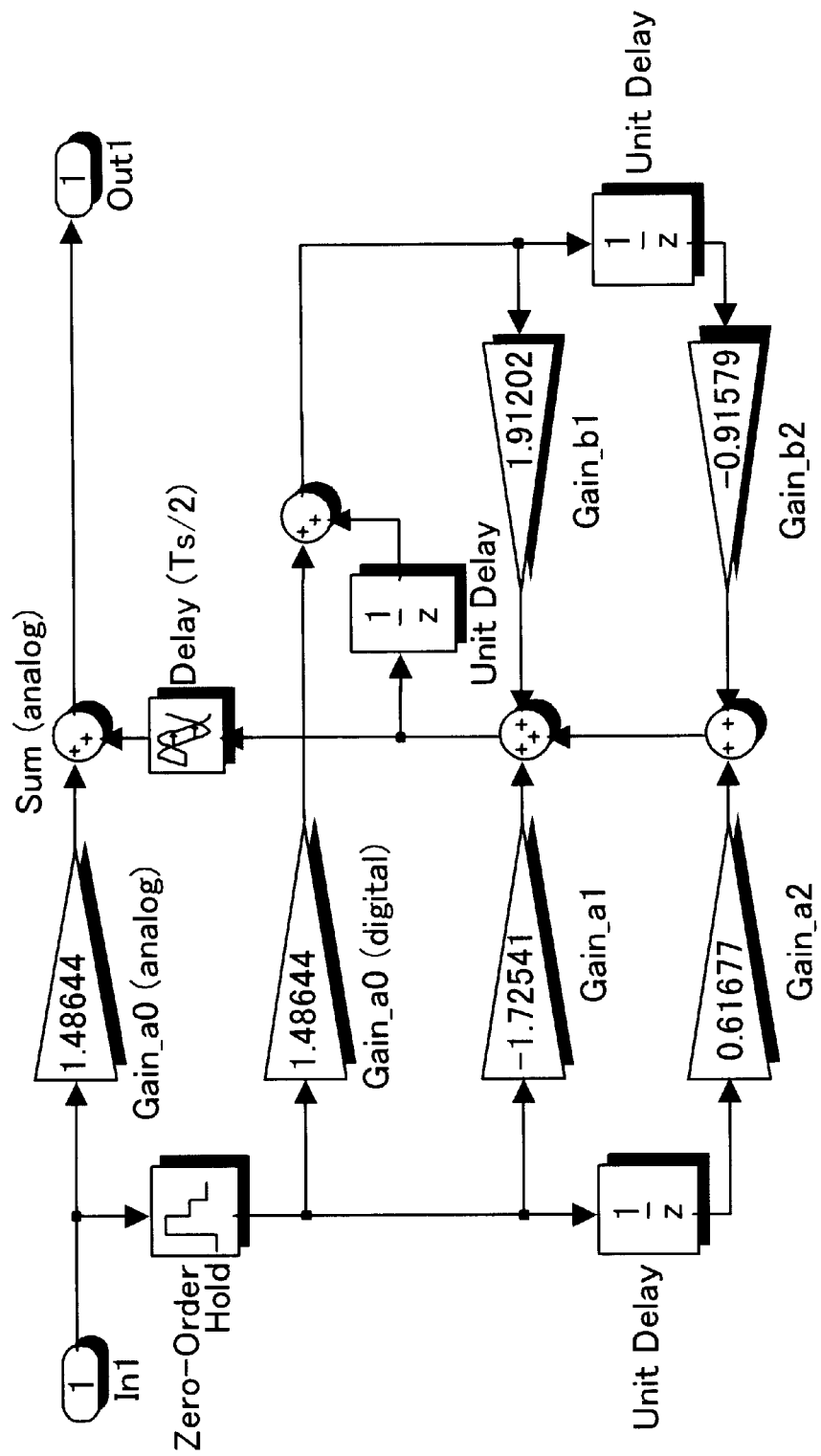
FIG. 26 is a diagram depicting a design example of the digital servo controller according to the Example 4 of the present invention.

As an example of the fourth embodiment of the present invention, the transfer function in the above Formula (4) was implemented by the method of the fourth embodiment, just like the Example 3, and FIG. 26 is a block diagram thereof. In this block diagram, only the block of "Gain_a0" and the addition block next thereto are based on the assumption that analog circuits are used, and the other blocks are all based on the assumption that the arithmetic processing is performed in DSP.

In the third embodiment, the control signal to be used for operation is obtained by the A/D converter, but in the fourth embodiment, the control signal is derived by operation. Just like the Example 3, simulation was performed with applying a sine wave which frequency 300 [Hz] and amplitude is 1 as the analog observation signal, and as a result, the control signal to be output completely matched with that of the Example 3.

Example 5

As an example of the fifth embodiment of the present invention, the transfer function in the Formula (4) was implemented in the same way as the Example 3 by the method of the fifth embodiment, and simulated, which will be introduced below. For comparison, the result when a controller having the same transfer characteristic was implemented by a conventional method, and the simulation result when the controller having the same transfer characteristic was implemented by an analog controller, will also be shown.

Figure 27:
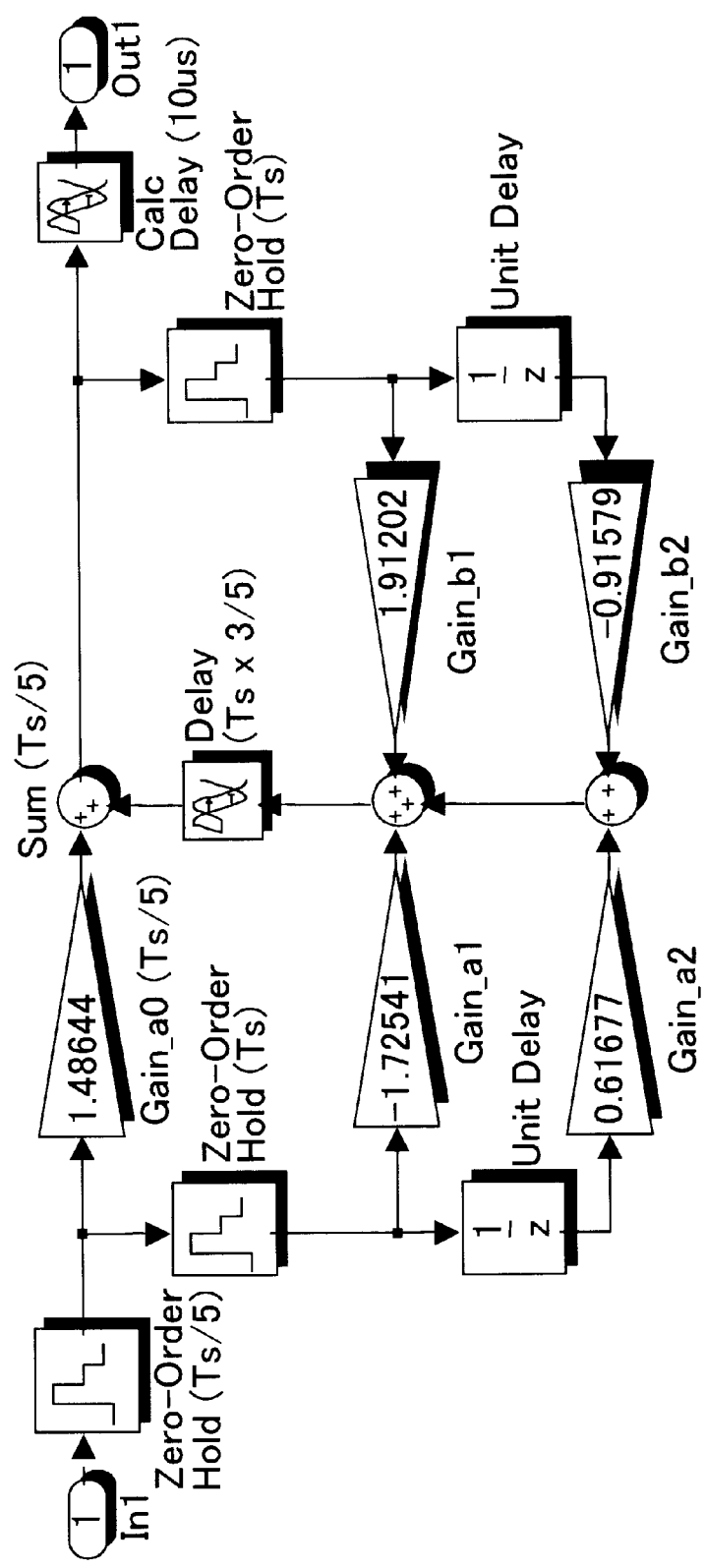
FIG. 27 is a diagram depicting a design example of the digital servo controller according to the Example 5 of the present invention.

FIG. 27 is a block diagram for implementing the controller according to the fifth embodiment by MATLAB/SIMULINK. In this block diagram, no block is based on the assumption that an analog circuit was used, and all are based on the assumption that arithmetic processing was performed in DSP.

In this operation, the operation period of the term $\alpha_0$ is Ts/5=20 [μs]. In this case, the delay time due to the hold characteristic of the term $\alpha_0$ is Ts/(2×5)=Ts/10=10 [μs], so the timing to output the result of the terms other than $\alpha_0$ must be such that the delay time is Ts/10. As the Example 3 and Example 4 show, the delay time becomes 0 if the result of the terms other than $\alpha_0$ is output at a point when Ts/2 has elapsed since the observation signal is obtained, and in order to set the delay time to be Ts/10, the output is updated at a point when the time (Ts/2+Ts/10)=Ts×⅗ has elapsed.

Figure 28:
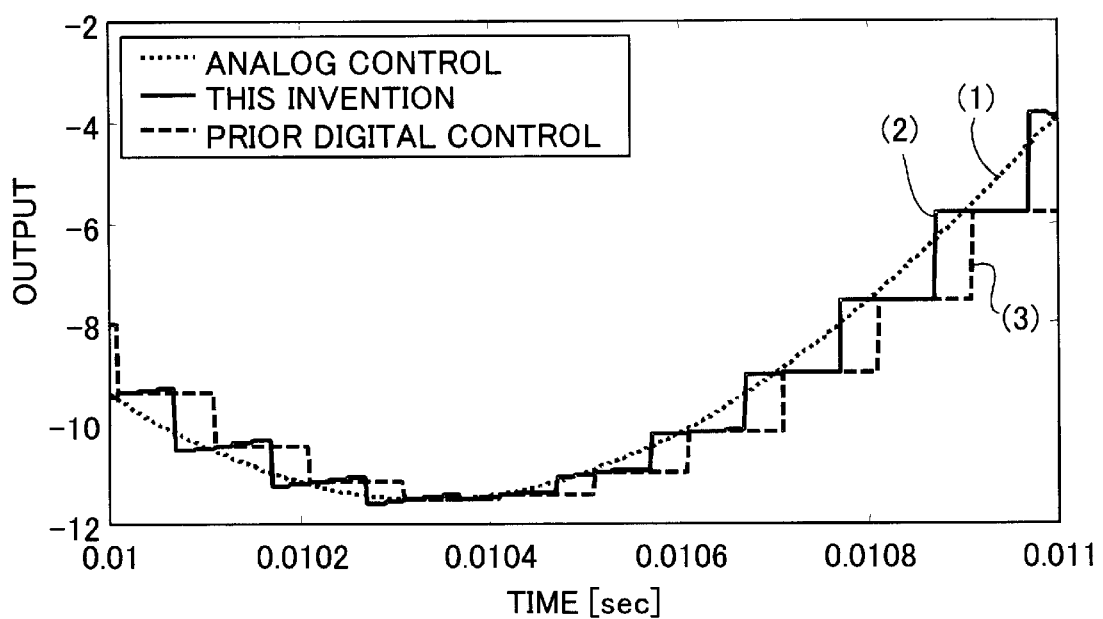
FIG. 28 is a diagram depicting the simulation result of the control signal according to the Example 5 of the present invention.
Figure 29:
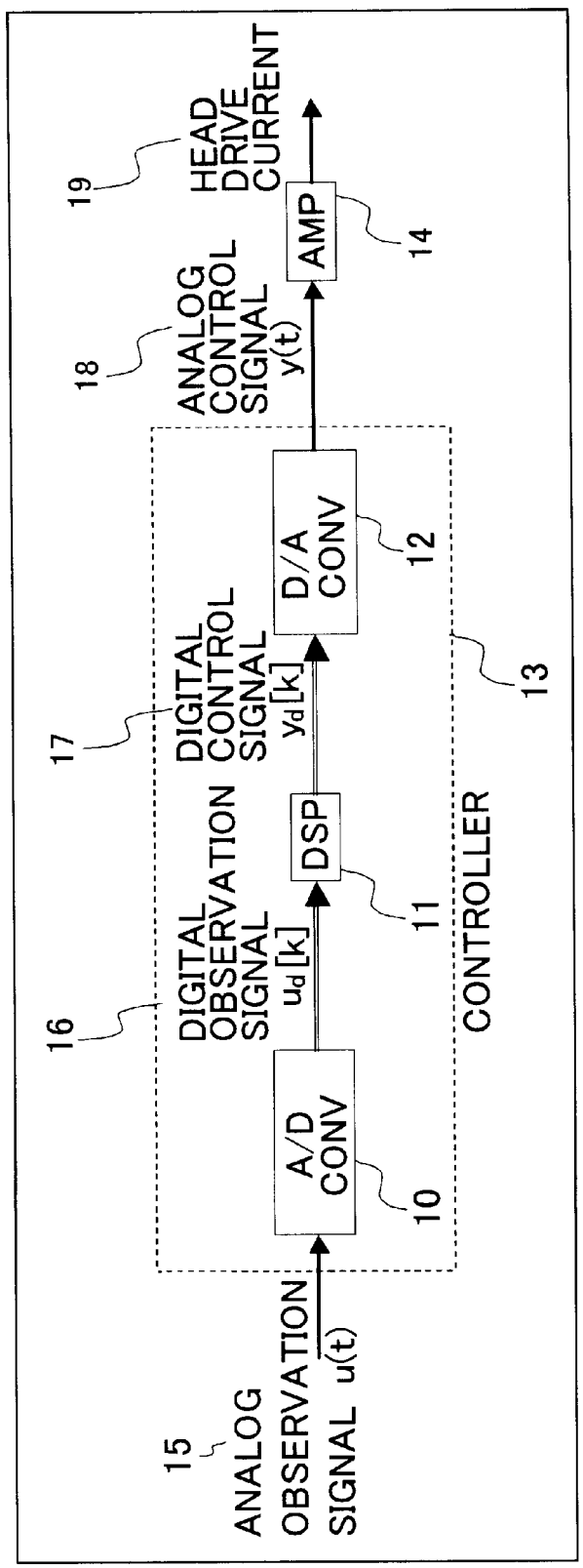
FIG. 29 is a diagram depicting a configuration of a conventional digital servo controller.

FIG. 28 shows (1) the control signal in the case of the analog controller, (2) the control signal in the case of the present invention 1, and (3) the control signal, in the case of a conventional digital controller when a sine wave which frequency is 300 [Hz] and amplitude is "1", is applied as the analog observation signal. In the simulation, the operation time delay of the DSP of the conventional digital controller is 10 [$\mu$s].

In this way, in the case of the Example 3, the control signal from the conventional digital controller generates delay time $\tau+Ts/2=10+100/2=60$ [$\mu$s] on average compared with the control signal from the analog controller, as shown in FIG. 15. But the control signal according to the third embodiment of the present invention does not have a delay time, compared with the control signal from the analog controller.

In the case of the Example 3, the number of observation signals and the control signals are both one, so the circuits to be added to the conventional digital controller are only analog amplification circuit x1, analog addition circuit x1, and A/D converter x1, so in terms of the generation configuration, cost increases very little.

The delay time of a controller appears as the delay of phase in the transfer characteristic. When the delay time is 60 [$\mu$s], as in the conventional digital controller of this example, the phase characteristic of the transfer characteristic delays about 22 [deg] when the frequency is 1 [kHz], so the performance of the control system deteriorates by this much. Therefore by applying the third embodiment of the present invention, the performance of the control system can be improved with little cost.

Example 4 as well can generate the effect where no delay time is generated, just like the Example 3. In this example, the number of the observation signals and the control signals are both one, so the circuits to be added to the conventional digital controller are only analog amplification circuit x1 and analog addition circuit x1, so in terms of the generation configuration, cost increases very little. Compared with the Example 3, the merit is that there is no need to add an A/D converter, but the calculation volume increases since the control signal must be calculated.

In the Example 5, the control signal from the conventional digital controller has a 60 [$\mu$s] delay time, as shown in FIG. 20, just like the Example 3. Whereas the control signal of the Example 5 has delay time $\tau+Ts/10=20$ [$\mu$s], which is ⅓ the above mentioned delay time.

In the case of the Example 5, the number of observation signals and the control signals are both one, and the operation period of the term $\alpha_0$ is 5 times the basic operation period, so an extra operation for multiplication x4 and addition x4 is required per period, compared with the conventional digital controller.

In order to implement the delay time of 20 [$\mu$s] in the Example 5 using the conventional digital controller, the operation must be completed within $Ts/5=20$ [$\mu$s], so the operation amount is much larger than the Example 4. Therefore by applying the method of the Example 4, the delay time can be dramatically decreased by increasing the calculation amount slightly, and as a result the control performance can be improved.

[Other Embodiments]

The digital servo controller was described using the track controller of a disk device, but the present invention can be applied to control of a storage device, which handles such storage media as tapes and cards. The processor of digital control was described using DSP, but other processor can be used for the present invention.

The present invention has been described by the embodiments, but various modifications are possible within the range of the essential character of the present invention, which shall not be excluded from the technical scope of the present invention.

INDUSTRIAL APPLICABILITY

According to the present invention, in a digital servo for executing the output equation $yd[k]=C \cdot x[k]+D \cdot ud[k]$ and state equation $x[k+1]=A \cdot x[k]+B \cdot ud[k]$, the second term $D \cdot ud[k]$ (hereafter direct term) of the output equation is output by the analog circuit, and the first term $C \cdot x[k]$ is output earlier for Ts/2, so that the average delay time of the respective signal can be 0, delay by digital processing can be prevented, and high precision digital control becomes possible with an inexpensive processor.

According to another aspect of the present invention, the direct term of the output equation is executed at period Ts/N (N is a 2 or higher natural number) which is 1/N of the basic operation period Ts, and the first term is updated with the same delay time as the average delay time Ts/(2N) of the direct term, so that the average delay time of the control signal can be $\tau+Ts/(2N)$, delay caused by digital processing can be decreased, and high precision digital control becomes possible with an inexpensive processor.

Also according to the present invention, in a digital servo for calculating the equation represented by the transfer function, the term $\alpha 0$ (hereafter direct term) of the equation of the transfer function representation is output by the analog circuit and the other terms are output earlier for Ts/2, so that the average delay time of the respective signal can be 0, delay caused by digital processing can be prevented, and high precision digital control becomes possible with an inexpensive processor.

According to another embodiment, the direct term of the equation is executed at period Ts/N (N is a 2 or higher natural number), which is 1/N of the basic operation period Ts, and the other terms are updated with the same delay time as the average delay time Ts/(2N) of the direct term, so that the average delay time of the control signal can be $\tau+Ts/(2N)$, delay caused by digital processing can be decreased, and high precision digital control becomes possible with an inexpensive processor.

Also in the storage device and head position control device, high precision position control can be implemented with an inexpensive configuration, and a storage device with high recording density can be provided inexpensively.

What is claimed is:

1. A digital servo control method for receiving an analog observation signal u(t) from a control target and generating a control signal to servo-control said control target using a following output equation and state equation, comprising the steps of:

multiplying said analog observation signal u(t) by D using an analog amplifier;

converting said analog observation signal u(t) into a digital observation signal ud[k] by an A/D converter at each operation period Ts, calculating said state equation by a processor, and calculating $C \cdot x[k+1]$ of said output equation based on the result $x[k+1]$ of the calculation of the state equation;

outputting said calculated value of $C \cdot x[k+1]$ to a D/A converter at a point when Ts/2 has elapsed since u(t) is observed; and adding said analog observation signal multiplied by D and the output of said D/A converter, and outputting said control signal y(t);

said Output equation: yd[k]=C·x[k]+D·ud[k]
said State equation: x[k+1]=A·x[k]+B·ud[k]
where ud[k] is an observation signal to be input; yd[k] is a control signal to be output; x[k] is a state variable; A, B, C and D are constant matrixes; and k is a parameter to indicate a sampling time.

2. A digital servo control method for receiving an analog observation signal u(t) from a control target, and generating a control signal to servo-control said control target using a following output equation and state equation, comprising the steps of:
converting said analog observation signal u(t) into a digital signal by an A/D converter at each operation period Ts/N (N is a 2 or higher natural number), and calculating D·ud[k] of the following output equation by a processor;
calculating the following state equation at each operation period Ts by said processor, and calculating C·x[k+1] of the following output equation based on the result x[k+1] of the calculation of the state equation;
calculating the control signal yd[k] each time said D·ud[k] and said C·x[k+1] are updated; and
outputting said calculated yd[k] to a D/A converter and outputting said analog control signal y(t);
said Output equation: yd[k]=C·x[k]+D·ud[k]
said State equation: x[k+1]=A·x[k]+B·ud[k]
where ud[k] is an observation signal to be input; yd[k] is a control signal to be output; x[k] is a state variable; A, B, C and D are constant matrixes; and k is a parameter to indicate a sampling time.

3. A digital servo control method according to claim 2, wherein said step of calculating the control signal further comprises a step of updating said C·x[k+1] corresponding to the delay time Ts/(2N) which said D·ud[k] has.

4. A digital servo controller which receives an analog observation signal u(t) from a control target and generates a control signal to servo-control said control target using a following output equation and state equation, comprising:
an analog amplifier for multiplying said analog observation signal u(t) by D;
an A/D converter for converting said analog observation signal u(t) into a digital observation signal ud[k] at each operation period Ts;
a processor for receiving said digital observation signal, calculating the following state equation, calculating C·x[k+1] of the following output equation based on the result x[k+1] of the calculation of the state equation, and outputting said calculated value of C·x[k+1] to a D/A converter at a point when Ts/2 has elapsed since u(t) is observed; and
an analog adder for adding said analog observation signal multiplied by D and the output of said D/A converter, and outputting said control signal y(t);
said Output equation: yd[k]=C·x[k]+D·ud[k]
said State equation: x[k+1]=A·x[k]+B·ud[k]
where ud[k] is an observation signal to be input; yd[k] is a control signal to be output; x[k] is a state variable; A, B, C and D are constant matrixes; and k is a parameter to indicate a sampling time.

5. A digital servo controller which receives an analog observation signal u(t) from a control target and generates a control signal to servo-control said control target using a following output equation and state equation, comprising:
an A/D converter for converting said analog observation signal u(t) into a digital signal at each operation period Ts/N (N is a 2 or higher natural number);
a processor for calculating D·ud[k] of the following output equation from said digital signal, calculating the following state equation at each operation period Ts, calculating C·x[k+1] of the following output equation based on the result x[k+1] of the calculation of the state equation, and calculating the control signal yd[k] each time said D·ud[k] and said C·x[k+1] are updated; and
a D/A converter for converting said calculated yd[k] into said analog control signal y(t);
said Output equation: yd[k]=C·x[k]+D·ud[k]
said State equation: x[k+1]=A·x[k]+B·ud[k]
where ud[k] is an observation signal to be input; yd[k] is a control signal to be output; x[k] is a state variable; A, B, C and D are constant matrixes; and k is a parameter to indicate a sampling time.

6. The digital servo controller according to claim 5, wherein said processor updates said C·x[k+1] according to the delay time Ts/(2N) which said D·ud[k] has.

7. A storage device comprising:
a head for at least reading a storage medium;
an actuator for moving said head with respect to said storage medium; and
a digital servo controller for receiving an analog observation signal u(t) from said head and generating a control signal to servo-control said actuator using a following output equation and state equation,
wherein said digital servo controller comprises:
an analog amplifier for multiplying said analog observation signal u(t) by D;
an A/D converter for converting said analog observation signal u(t) into a digital observation signal ud[k] at each operation period Ts;
a processor for receiving said digital observation signal, calculating the following state equation, calculating C·x[k+1] of the following output equation based on the result x[k+1] of the calculation of the state equation, and outputting said calculated value C·x[k+1] to a D/A converter at a point when Ts/2 has elapsed since u(t) is observed; and
an analog adder for adding said analog observation signal multiplied by D and said output of the D/A converter, and outputting said control signal y(t);
said Output equation: yd[k]=C·x[k]+D·ud[k]
said State equation: x[k+1]=A·x[k]+B·ud[k]
where ud[k] is an observation signal to be input; yd[k] is a control signal to be output; x[k] is a state variable; A, B, C and D are constant matrixes; and k is a parameter to indicate a sampling time.

8. A storage device comprising:
a head for at least reading a storage medium;
an actuator for moving said head with respect to said storage medium; and
a digital servo controller for receiving an analog observation signal u(t) from said head and generating a control signal to servo-control said actuator using a following output equation and state equation,
wherein said digital servo controller comprises:
an A/D converter for converting said analog observation signal u(t) into a digital signal at each operation period Ts/N (N is a 2 or higher natural number);
a processor for calculating D·ud[k] of the following output equation from said digital signal, calculating the following state equation at each operation period Ts, calculating C·x[k+1] of the following output equation based on the result x[k+1] of the calculation of the state equation and calculating the control signal yd[k] each time said D·ud[k] and said C·x[k+1] are updated; and a D/A converter for converting said calculated yd[k] into said analog control signal y(t);

said Output equation: yd[k]=C·x[k]+D·ud[k]

said State equation: x[k+1]=A·x[k]+B·ud[k]

where ud[k] is an observation signal to be input; yd[k] is a control signal to be output; x[k] is a state variable; A, B, C and D are constant matrixes; and k is a parameter to indicate a sampling time.

9. The storage device according to claim 8, wherein said processor updates said C·x[k+1] corresponding to the delay time Ts/(2N) which said D·ud[k] has.

10. The storage device according to claim 7, wherein said head is constituted by an optical head for reading an optical storage medium constituting said storage medium, and said digital servo controller receives a track error signal from said optical head and generates a control signal of said actuator for moving said head in the direction crossing the track of said optical storage medium.

11. The storage device according to claim 8, wherein said head is constituted by an optical head for reading an optical storage medium constituting said storage medium, and said digital servo controller receives a track error signal from said optical head and generates a control signal of said actuator for moving said head in the direction crossing the track of said optical storage medium.

12. A head position control method for receiving an analog observation signal u(t) from a head and generating a control signal to servo-control an actuator for moving the head using a following output equation and state equation, comprising the steps of:

multiplying said analog observation signal u(t) by D using an analog amplifier;

converting said analog observation signal u(t) into a digital observation signal ud[k] by an A/D converter at each operation period Ts, calculating said state equation by a processor, and calculating C·x[k+1] of said output equation based on the result x[k+1] of the calculation of the state equation;

outputting said calculated value of C·x[k+1] to a D/A converter at a point when Ts/2 has elapsed since u(t) is observed; and adding said analog observation signal multiplied by D and the output of said D/A converter, and outputting said control signal y(t);

said Output equation: yd[k]=C·x[k]+D·ud[k]

said State equation: x[k+1]=A·x[k]+B·ud[k]

where ud[k] is an observation signal to be input; yd[k] is a control signal to be output; x[k] is a state variable; A, B, C and D are constant matrixes; and k is a parameter to indicate a sampling time.

13. A head position control method for receiving an analog observation signal u(t) from a head and generating a control signal to servo-control an actuator for moving the head using a following output equation and state equation, comprising the steps of:

converting said analog observation signal u(t) into a digital signal by an A/D converter at each operation period Ts/N (N is a 2 or higher natural number), and calculating D·ud[k] of the following output equation by a processor;

calculating the following state equation at each operation period Ts by said processor, and calculating C·x[k+1] of the following output equation based on the result x[k+1] of the calculation of the state equation;

calculating the control signal yd[k] each time said D·ud[k] and said C·x[k+1] are updated; and outputting said calculated yd[k] to a D/A converter and outputting said analog control signal y(t);

said Output equation: yd[k]=C·x[k]+D·ud[k]

said State equation: x[k+1]=A·x[k]+B·ud[k]

where ud[k] is an observation signal to be input; yd[k] is a control signal to be output; x[k] is a state variable; A, B, C and D are constant matrixes; and k is a parameter to indicate a sampling time.

14. The head position control method according to claim 13, wherein said step of calculating the control signal further comprises a step of updating said C·x[k+1] corresponding to the delay time Ts/(2N) which said D·ud[k] has.

15. The head position control method according to claim 12, wherein said analog observation signal comprises a track error signal from an optical head for reading an optical storage medium constituting said storage medium, and said control signal comprises a control signal of said actuator for moving said head to the direction crossing the track of said optical storage medium.

16. The head position control method according to claim 13, wherein said analog observation signal comprises a track error signal from an optical head for reading an optical storage medium constituting said storage medium, and said control signal comprises a control signal of said actuator for moving said head to direction crossing the track of said optical storage medium.

17. A digital servo control method comprising the steps of:

converting an analog observation signal from a control target into a digital observation signal by an A/D converter at each operation period Ts, calculating terms other than the term $\alpha_0$ of a following transfer equation by a processor, and outputting the result to a D/A converter;

multiplying said analog observation signal by $\alpha_0$; and adding said analog observation signal multiplied by $\alpha_0$ and the output of said D/A converter and outputting a control signal y(z);

$$\frac{y(z)}{u(z)} = \frac{\alpha_0 \cdot z^\wedge n + \alpha_1 \cdot z^\wedge(n-1) + \cdots + \alpha_{n-2} \cdot z^\wedge 1 + \alpha_{n-1}}{z^\wedge m + \beta_1 \cdot z^\wedge(m-1) + \ldots + \beta_{m-2} \cdot z^\wedge 1 + \beta_{m-1}} \quad (3)$$

(where y(z) is a control signal to be output to the amplifier 6, u(z) is an observation signal to be input from the A/D converter, $\alpha i$ and $\beta i$ are constants, n and m are arbitrary integers, and z is a discrete time operator).

18. A digital servo control method for receiving an analog observation signal from a control target and generating a control signal to servo-control said control target using a following transfer equation, comprising the steps of:

converting said analog observation signal into a digital signal by an A/D converter at each operation period Ts/N (N is a 2 or higher natural number), and calculating a term $\alpha_0$ of the following transfer equation by a processor;

calculating terms other than the term $\alpha_0$ of the following transfer equation at each operation period Ts by said processor; and adding the calculating result of the term $\alpha_0$ and the calculation result of terms other than said term $\alpha_0$ at period Ts/N, outputting the result to a D/A converter, and outputting an analog control signal y(z);

$$\frac{y(z)}{u(z)} = \frac{\alpha_0 \cdot z^\wedge n + \alpha_1 \cdot z^\wedge(n-1) + \cdots + \alpha_{n-2} \cdot z^\wedge 1 + \alpha_{n-1}}{z^\wedge m + \beta_1 \cdot z^\wedge(m-1) + \ldots + \beta_{m-2} \cdot z^\wedge 1 + \beta_{m-1}} \quad (3)$$

(where y(z) is a control signal to be output to the amplifier 6, u(z) is an observation signal to be input from the A/D converter, αi and βi are constants, n and m are arbitrary integers, and z is a discrete time operator).

19. A digital servo controller, comprising:

an A/D converter for converting an analog observation signal from a control target into a digital observation signal;

a processor for receiving said digital observation signal and calculating terms other than a term $\alpha_0$ of a following transfer equation;

a D/A converter for converting said calculation result into an analog signal;

an analog amplifier for multiplying said analog observation signal by $\alpha_0$; and an addition circuit for adding said analog observation signal multiplied by $\alpha_0$ and the output of said D/A converter, and outputting a control signal y(z);

$$\frac{y(z)}{u(z)} = \frac{\alpha_0 \cdot z^\wedge n + \alpha_1 \cdot z^\wedge(n-1) + \cdots + \alpha_{n-2} \cdot z^\wedge 1 + \alpha_{n-1}}{z^\wedge m + \beta_1 \cdot z^\wedge(m-1) + \ldots + \beta_{m-2} \cdot z^\wedge 1 + \beta_{m-1}} \quad (3)$$

(where y(z) is a control signal to be output to the amplifier, u(z) is an observation signal to be input from the A/D converter, αi and βi are constants, n and m are arbitrary integers, and z is a discrete time operator).

20. A digital servo controller for receiving an analog observation signal from a control target and generating a control signal to servo-control said control target using a following transfer equation, comprising:

an A/D converter for converting said analog observation signal into a digital observation signal at each operation period Ts/N (N is a 2 or higher natural number);

a processor for receiving said digital observation signal, calculating the term $\alpha_0$ of following transfer equation at a period Ts/N, calculating terms other than the term $\alpha_0$ of the following transfer equation at each operation period Ts, and adding the calculation result of the term $a_0$ and the calculation result of said terms other than $\alpha_0$ at period Ts/N; and a D/A converter for converting said addition result S into an analog signal, and outputting an analog control signal y(z);

$$\frac{y(z)}{u(z)} = \frac{\alpha_0 \cdot z^\wedge n + \alpha_1 \cdot z^\wedge(n-1) + \cdots + \alpha_{n-2} \cdot z^\wedge 1 + \alpha_{n-1}}{z^\wedge m + \beta_1 \cdot z^\wedge(m-1) + \ldots + \beta_{m-2} \cdot z^\wedge 1 + \beta_{m-1}} \quad (3)$$

(where y(z) is a control signal to be output to the amplifier, u(z) is an observation signal to be input from the A/D converter, αi and βi are constants, n and m are arbitrary integers, and z is a discrete time operator).

* * * * *

UNITED STATES PATENT AND TRADEMARK OFFICE
CERTIFICATE OF CORRECTION

PATENT NO. : 6,653,965 B2
DATED : November 25, 2003
INVENTOR(S) : Yoshiaki Ikai

It is certified that error appears in the above-identified patent and that said Letters Patent is hereby corrected as shown below:

<u>Column 30,</u>
Line 17, delete "result S" and insert -- result -- therefor.

Signed and Sealed this

Eleventh Day of May, 2004

JON W. DUDAS
*Acting Director of the United States Patent and Trademark Office*